United States Patent
De Wit et al.

(10) Patent No.: US 9,249,378 B2
(45) Date of Patent: *Feb. 2, 2016

(54) AQUEOUS CLEANING COMPOSITIONS HAVING ENHANCED PROPERTIES

(71) Applicant: Eastman Chemical Company, Kingsport, TN (US)

(72) Inventors: Jos Simon De Wit, Kingsport, TN (US); Mark Stanley Pavlin, Kingsport, TN (US)

(73) Assignee: Eastman Chemical Company, Kingsport, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 13/957,631

(22) Filed: Aug. 2, 2013

(65) Prior Publication Data

US 2015/0038391 A1    Feb. 5, 2015

(51) Int. Cl.
| | |
|---|---|
| *C11D 1/00* | (2006.01) |
| *C11D 9/26* | (2006.01) |
| *C07C 67/31* | (2006.01) |
| *C07C 69/72* | (2006.01) |
| *C07C 69/675* | (2006.01) |
| *C11D 3/20* | (2006.01) |
| *C09D 7/00* | (2006.01) |
| *C09D 9/00* | (2006.01) |
| *C11D 7/26* | (2006.01) |

(Continued)

(52) U.S. Cl.
CPC ............. *C11D 3/2093* (2013.01); *C09D 7/001* (2013.01); *C09D 9/005* (2013.01); *C11D 3/43* (2013.01); *C11D 7/266* (2013.01); *C11D 7/5022* (2013.01); *C11D 11/0017* (2013.01); *C11D 11/0023* (2013.01); *C23G 5/032* (2013.01); *C23G 5/06* (2013.01)

(58) Field of Classification Search
CPC .......... C11D 1/00; C11D 3/2093; C11D 9/26; C07C 67/31; C07C 69/72; C07C 69/675
USPC .................................................. 510/417, 505
See application file for complete search history.

(56) References Cited

U.S. PATENT DOCUMENTS

| | | | |
|---|---|---|---|
| 2,351,366 A | 6/1944 | Pohl et al. | |
| 2,396,278 A | 3/1946 | Lind | |

(Continued)

FOREIGN PATENT DOCUMENTS

| | | |
|---|---|---|
| EP | 1502584 A1 | 2/2005 |
| EP | 1537247 B1 | 9/2007 |

(Continued)

OTHER PUBLICATIONS

ASTM D1160, Aug. 14, 2013.

(Continued)

*Primary Examiner* — Brian P Mruk
(74) *Attorney, Agent, or Firm* — Hovey Williams LLP

(57) ABSTRACT

Cleaning compositions and methods of making and using the same are provided. The cleaning compositions of the present invention are both non-toxic and environmentally benign, and are effective at removing both hydrophobic and hydrophilic soils from a wide range of substrate types, including metal, glass, painted wall board, vinyl, concrete, and many others. The cleaning compositions of the present invention may be useful in a variety of domestic, industrial, and/or institutional applications.

51 Claims, 5 Drawing Sheets

(51) Int. Cl.

| | |
|---|---|
| C11D 7/50 | (2006.01) |
| C23G 5/032 | (2006.01) |
| C11D 11/00 | (2006.01) |
| C23G 5/06 | (2006.01) |
| C11D 3/43 | (2006.01) |

(56) References Cited

U.S. PATENT DOCUMENTS

| | | |
|---|---|---|
| 2,486,921 A | 11/1949 | Byerly |
| 2,486,922 A | 11/1949 | Strain |
| 2,847,423 A | 8/1958 | Lacey |
| 3,332,880 A | 7/1967 | Kessler et al. |
| 3,513,189 A | 5/1970 | Marcus |
| 4,005,189 A | 1/1977 | Reese et al. |
| 4,994,602 A | 2/1991 | Seido et al. |
| 5,183,929 A | 2/1993 | Naito et al. |
| 5,420,335 A | 5/1995 | Birkhahn et al. |
| 5,508,435 A | 4/1996 | Armstrong, III et al. |
| 5,519,161 A | 5/1996 | Birkhahn et al. |
| 5,612,303 A | 3/1997 | Takayanagi et al. |
| 5,686,489 A | 11/1997 | Yu et al. |
| 5,693,850 A | 12/1997 | Birkhahn et al. |
| 5,800,897 A | 9/1998 | Sharma et al. |
| 5,876,621 A | 3/1999 | Sapienza |
| 5,980,774 A | 11/1999 | Sapienza |
| 6,043,063 A | 3/2000 | Kurdikar et al. |
| 6,075,154 A | 6/2000 | Gonda et al. |
| 6,083,729 A | 7/2000 | Martin et al. |
| 6,307,094 B1 | 10/2001 | Chong et al. |
| 6,492,545 B2 | 12/2002 | Saito et al. |
| 6,586,152 B1 | 7/2003 | Urano et al. |
| 6,709,848 B1 | 3/2004 | Martin et al. |
| 6,818,789 B2 | 11/2004 | Fleming et al. |
| 6,843,931 B2 | 1/2005 | Sapienza |
| 6,844,447 B2 | 1/2005 | Zhong et al. |
| 6,897,338 B2 | 5/2005 | Zhong et al. |
| 6,933,404 B2 | 8/2005 | Zhong et al. |
| 6,939,981 B1 | 9/2005 | Boaz |
| 7,001,969 B2 | 2/2006 | Zhong et al. |
| 7,057,064 B2 | 6/2006 | Proctor et al. |
| 7,166,743 B2 | 1/2007 | Zhong et al. |
| 7,230,144 B2 | 6/2007 | Zhong et al. |
| 7,419,759 B2 | 9/2008 | Kim et al. |
| 7,485,452 B2 | 2/2009 | Hwang et al. |
| 7,563,385 B2 | 7/2009 | Sapienza |
| 7,795,376 B2 | 9/2010 | Van Walsem et al. |
| 8,338,145 B2 | 12/2012 | Tsobanakis et al. |
| 8,642,654 B2 | 2/2014 | Clarke et al. |
| 2005/0221457 A1 | 10/2005 | Tsobanakis et al. |
| 2006/0078596 A1 | 4/2006 | Clarke et al. |
| 2006/0251597 A1 | 11/2006 | Van Scott et al. |
| 2007/0082832 A1 | 4/2007 | DiCosimo et al. |
| 2007/0208183 A1 | 9/2007 | Haan et al. |
| 2008/0038802 A1* | 2/2008 | Hwang .................... C12P 7/62 435/135 |
| 2008/0287538 A1 | 11/2008 | Scholz et al. |
| 2009/0298144 A1 | 12/2009 | Tsobanakis et al. |
| 2010/0119939 A1 | 5/2010 | Misumi et al. |
| 2010/0286017 A1* | 11/2010 | Righetto ........................ 510/283 |
| 2011/0101268 A1 | 5/2011 | Choi et al. |
| 2011/0107660 A1 | 5/2011 | Chen et al. |
| 2011/0151379 A1 | 6/2011 | Choi et al. |
| 2011/0195839 A1 | 8/2011 | Schlotterbeck et al. |
| 2011/0195846 A1* | 8/2011 | Troppmann et al. ........... 504/358 |
| 2012/0064611 A1 | 3/2012 | Robertson et al. |
| 2012/0317736 A1 | 12/2012 | Gonzales et al. |
| 2013/0102663 A1 | 4/2013 | Clarke |
| 2014/0194509 A1 | 7/2014 | Clarke et al. |
| 2014/0308719 A1 | 10/2014 | Clarke et al. |
| 2015/0065571 A1 | 3/2015 | Clarke et al. |

FOREIGN PATENT DOCUMENTS

| | | |
|---|---|---|
| EP | 1601737 B1 | 10/2007 |
| FR | 2 577 922 A1 | 8/1986 |
| GB | 2511941 A | 9/2014 |
| JP | 2009-173880 A | 8/2009 |
| KR | 2006024550 A | 3/2006 |
| WO | 2011/039661 A2 | 4/2011 |
| WO | 2012/039516 A1 | 3/2012 |
| WO | 2014/139599 A1 | 9/2014 |

OTHER PUBLICATIONS

ASTM D7236-07, Aug. 14, 2013.
ASTM E659-78, Aug. 14, 2013.
ASTM D4052-11, Aug. 14, 2013.
ASTM D4488, 2001.
Vuitel et al., "Etude de la reactivite de la function carbonyle avec le cetene en presence d'un alcoxyde de titane", Helvetica Chemica Acta, vol. 57, pp. 1713-1718 (1974).
Riis et al., "Gas chromatograph determination of poly-β-hydroxybutyric acid in microbial biomass after hydrochloric acid propanolysis", Journal of Chromatography, vol. 445, pp. 285-289 (1988).
Adkins, et al., "The Hydrogenation of Acetoacetic Ester and Certain of its Derivatives Over Nickel", J. Am. Chem. Soc., vol. 52, pp. 5192-5198 (1930).
Co-pending U.S. Appl. No. 13/957,642, filed Aug. 2, 2013.
Co-pending U.S. Appl. No. 13/957,657, filed Aug. 2, 2013.
Co-pending U.S. Appl. No. 13/957,616, filed Aug. 2, 2013.
E.I. Klabunovskii, et al.; Reaction Kinetics and Catalysis Letters, vol. 2, No. 3, 291-296 (1975) on the Asymmetrizing and Catalytic Activity of Ru Catalysts.
USPTO Office Action dated Apr. 16, 2014 for co-pending U.S. Appl. No. 13/957,642.
Notification of Transmittal of the International Search Report and the Written Opinion of the International Searching Authority with Date of Mailing Oct. 15, 2014 for International Application No. PCT/US2014/047528.
Wanfang Li, et al.; "Ru-Catalyzed Asymmetric Hydrogenation of 3-Oxoglutaric Acid Derivatives via Solvent-Assisted Pinpoint Recognition of Carbonyls in Close Chemical Propinquity"; Organic Letters, 2011, vol. 13, No. 15, 3876-3879.
Sven-Olov Lawesson et al.; "t-Butyl Acetoacetate"; Organic Syntheses, Coll. vol. 5, p. 155 (1973); vol. 42, p. 28 (1962).
USPTO Office Action dated Nov. 7, 2014 for co-pending U.S. Appl. No. 13/957,616.
Notification of Transmittal of the International Search Report and the Written Opinion of the International Searching Authority with Date of Mailing Dec. 3, 2014 for International Application No. PCT/US2014/047531.
Notification of Transmittal of the International Search Report and the Written Opinion of the International Searching Authority with Date of Mailing Dec. 3, 2014 for International Application No. PCT/US2014/047524.
Notification of Transmittal of the International Search Report and the Written Opinion of the International Searching Authority with Date of Mailing Dec. 3, 2014 for International Application No. PCT/US2014/047526.
USPTO Office Action dated Jan. 5, 2015 for co-pending U.S. Appl. No. 13/957,642.
Notice of Allowance for related U.S. Appl. No. 13/957,616, filed Aug. 2, 2013, dated Mar. 11, 2015, 7 pages.
Lusty, C.J. et al., Poly-β-Hydroxybutyrate Depolymerases of Pseudomonas Lemoignei, Department of Bacteriology and Immunology, University of California, Berkeley, vol. 56, Jul. 12, 1966, pp. 960-965.
Notice of Allowance dated May 11, 2015 for co-pending U.S. Appl. No. 13/957,616, 8 pages.
Notice of Allowance dated Jun. 8, 2015 for co-pending U.S. Appl. No. 13/957,616, 7 pages.
Office Action dated Feb. 12, 2015 for co-pending U.S. Appl. No. 13/957,631, 10 pages.

(56) References Cited

OTHER PUBLICATIONS

Office Action dated Jun. 4, 2015 for co-pending U.S. Appl. No. 13/957,642, 12 pages.
Laird, Chemical Industry Digest, How to Minimize Scale Up Difficulties, Jul. 2010, pp. 51-56.
Wrightson et al., Safety Issues in the Scale-up of Chemical Reactions, 2013, pp. 1-6, www.rsc.org.
Notice of Allowance dated Jun. 26, 2015 for related U.S. Appl. No. 13/957,616, filed Aug. 2, 2013, 8 pages.
Office Action dated Jul. 13, 2015 for related U.S. Appl. No. 14/694,696; 9 pages.

* cited by examiner

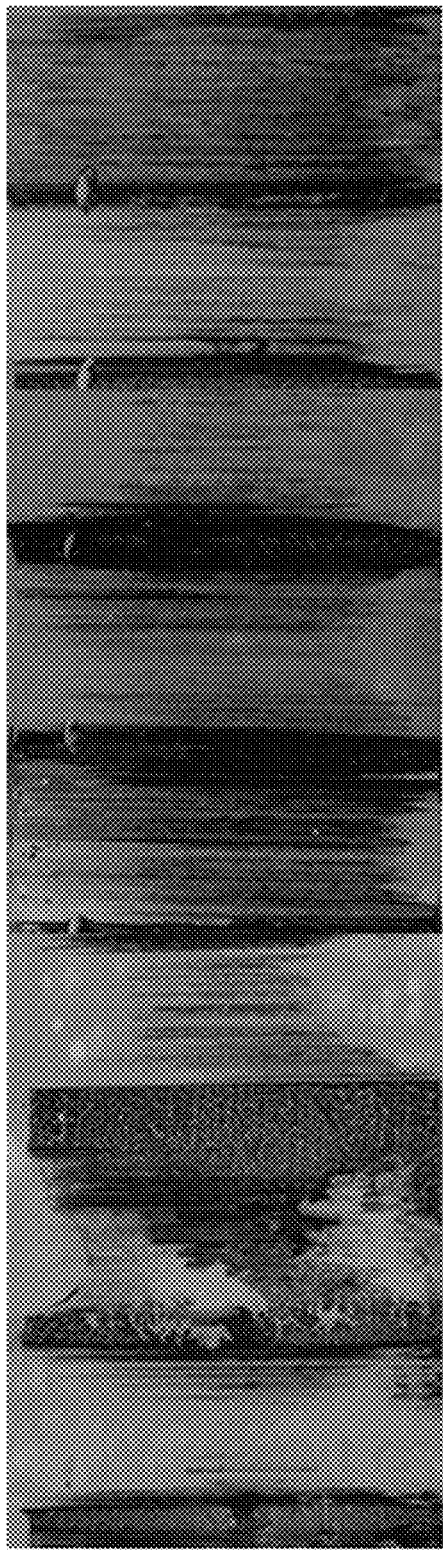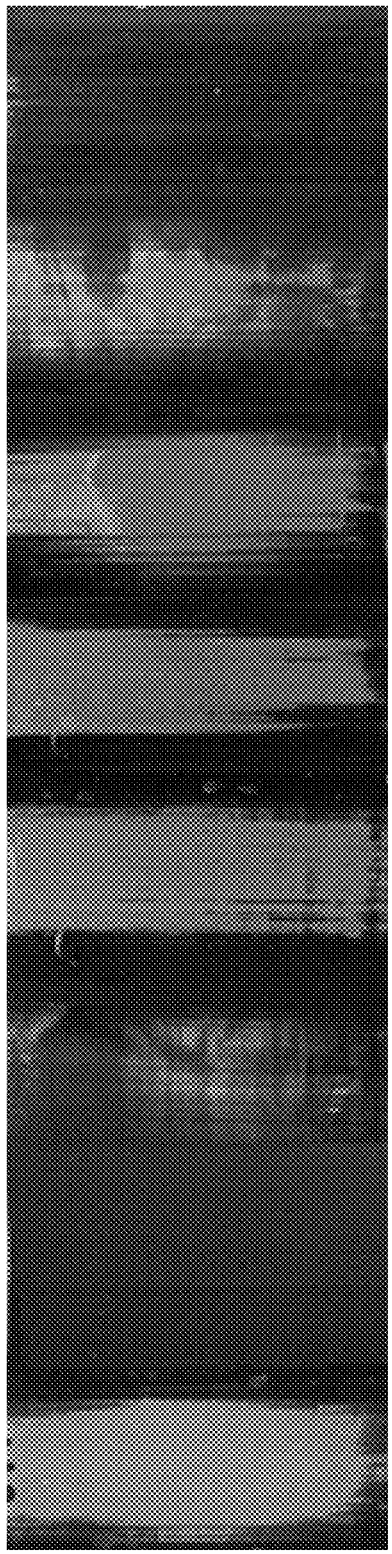

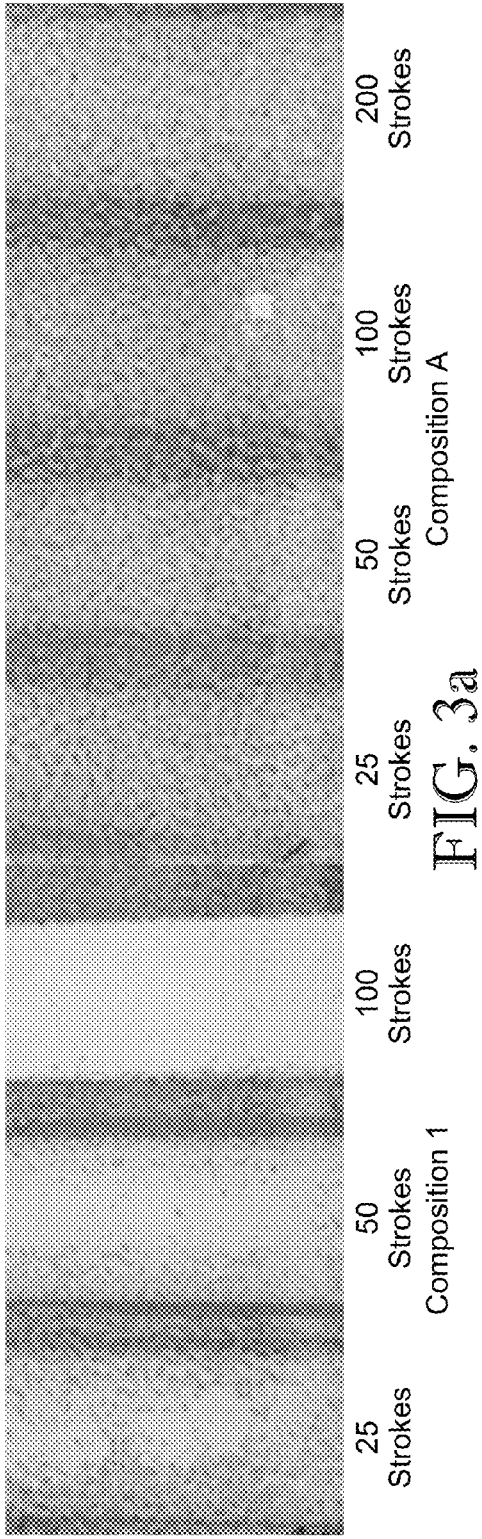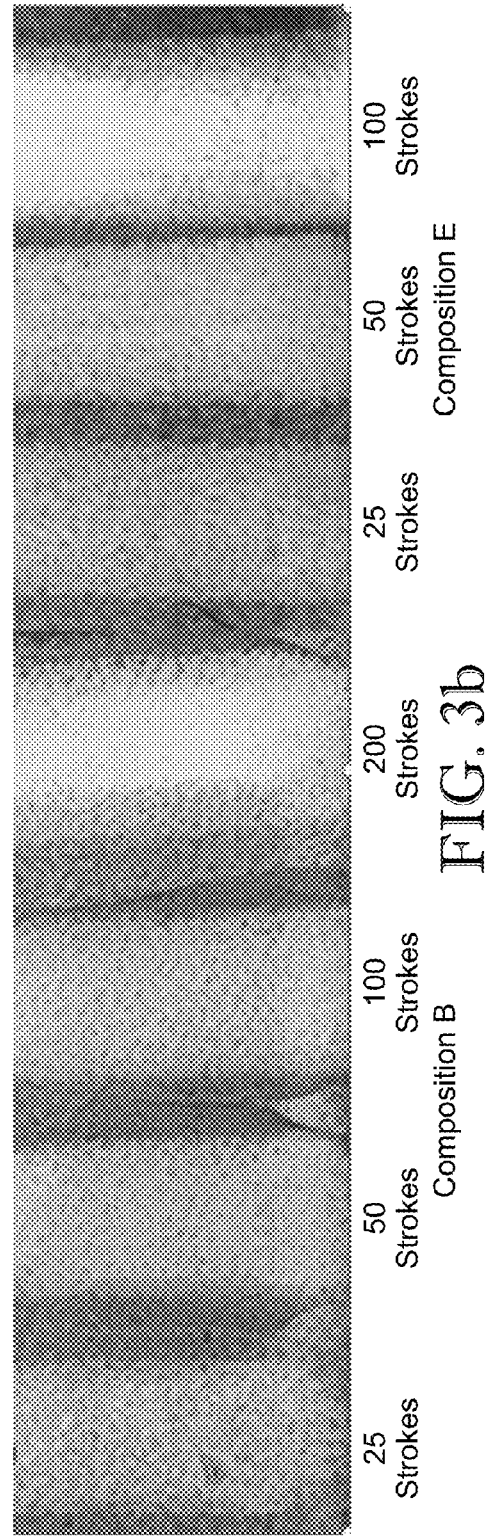

US 9,249,378 B2

AQUEOUS CLEANING COMPOSITIONS HAVING ENHANCED PROPERTIES

FIELD OF THE INVENTION

This invention relates to cleaning compositions for cleaning unwanted materials from a variety of substrates. This invention further relates to methods of using such compositions.

BACKGROUND

Aqueous cleaning compositions are useful for removing dirt and other soils from a variety of surfaces including hard surfaces such as floors, walls, countertops, and furniture. Many commercially-available aqueous cleaners include an organic solvent combined with water and optional ingredients such as surfactants, colorants, fragrances, and the like. Makers of these cleaning compositions, whether for household, industrial, or institutional use, are faced with the task of optimizing the cleaning formulations by selecting a solvent that exhibits excellent cleaning performance, but that causes minimum adverse effects on the user and the environment. To date, this problem has not been successfully resolved, as most high performance cleaning compositions do not have benign toxicity profiles and/or include high VOC solvents, while many "green" cleaners, recently developed in light of stricter environmental regulations, exhibit unsatisfactory cleaning performance.

Thus, a need exists for a safe, environmentally friendly cleaning composition capable of removing soil from a substrate with high efficiency. Preferably, the cleaning composition would be effective to remove a variety of types of undesirable substances from a wide range of substrates. Further, the cleaning composition should be able to be manufactured in a cost-effective manner and on a commercial scale.

SUMMARY

In one aspect, the present invention concerns an aqueous cleaning composition comprising water and at least one organic solvent having a vapor pressure of not more than 0.10 torr measured at 20° C. The cleaning composition has a hydrophobic cleaning efficiency of at least 90 percent in less than 1,000 strokes.

In another aspect, the present invention concerns an aqueous cleaning composition comprising water and at least one ester-containing solvent. The cleaning composition has a hydrophilic cleaning efficiency of at least 90 percent achieved in less than 500 strokes and a hydrophobic cleaning efficiency of at least 90 percent achieved in less than 1,000 strokes.

In yet another aspect, the present invention concerns a method for cleaning a substrate comprising contacting a substrate with a cleaning composition comprising water and at least one organic solvent having a vapor pressure of not more than 0.10 torr measured at 20° C. The cleaning composition has a hydrophobic cleaning efficiency of at least 90 percent in less than 1,000 strokes.

BRIEF DESCRIPTION OF THE DRAWINGS

Various aspects of the present invention are described in detail below with reference to the attached drawing figures, wherein:

FIG. 1 depicts the results of a baked grease scrub test performed using several comparative and inventive cleaning compositions to remove baked grease from an aluminum panel using the method described in Example 4;

FIG. 2 depicts the results of a tar-aluminum scrub test performed using several comparative and inventive cleaning compositions to remove tar from an aluminum panel using the method described in Example 4;

FIG. 3a depicts the results of a soap scum scrub test performed using a comparative and an inventive cleaning composition to remove soap scum from a painted wall board panel using the method described in Example 4;

FIG. 3b depicts the results of a soap scum scrub test performed using several comparative cleaning compositions to remove soap scum from a painted wall board panel using the method described in Example 4;

DETAILED DESCRIPTION

Figure 3C:
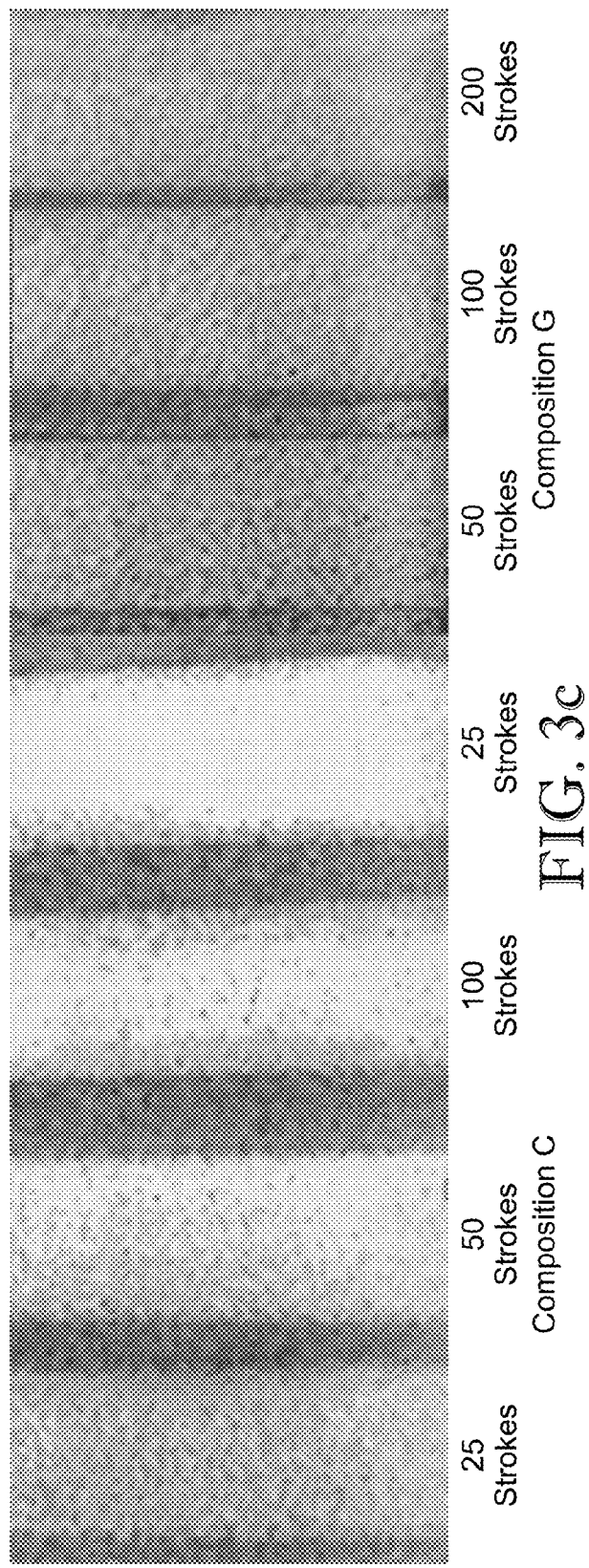
FIG. 3c depicts the results of a soap scum scrub test performed using several other comparative cleaning compositions to remove soap scum from a painted wall board panel using the method described in Example 4.

The present invention relates to aqueous cleaning compositions suitable for removing one or more soils from a substrate. As used herein, the term "soil" refers to any composition or material whose presence on a particular substrate is undesirable. Examples of soils can include, but are not limited to, dirt, tar, grease, oil, soap scum, protein, organics, enzymes, and combinations thereof. The cleaning compositions of the present invention can exhibit a high cleaning efficiency for a variety of soils and substrates, while exhibiting a benign toxicity profile and being environmentally compatible.

As used herein, the term "clean" or "cleaning" refers to the removal of at least a portion of one or more undesired materials from a substrate. The substrate being cleaned may present a hard surface and may be at least partially formed of one or more materials selected from the group consisting of metal, glass, plastic, ceramic, porcelain, fiberglass, stone, concrete, plaster, brick, marble, vinyl, natural or composite wood, wall board, or combinations thereof. Some substrates may be composite substrates, formed of two or more different materials, while others may be formed of a single material. At least a portion of the substrate may be coated with a coating material, such as paint or polymeric coating material, different from the material of the underlying substrate or the surface of the substrate may be uncoated. Other exemplary substrate materials include, but are not limited to, glazed or unglazed tile, porcelain, ceramics, marble, granite, stainless steel, aluminum, polyester, painted and unpainted wood, painted or unpainted, concrete, plaster, no-wax vinyl, linoleum, melamine, FORMICA™, CORIAN™, and chromed surfaces.

The type of soil able to be removed from one or more of the above-listed substrates by the cleaning composition of the present invention is not particularly limited and can include hydrophilic soils, hydrophobic soils, and neutral soils. The soils can be organic or inorganic and can have an acidic, neutral, or basic pH. The soil can comprise, for example, dirt, tar, grease, oil, soap scum, protein, organics, enzymes, and combinations thereof.

In one aspect, the present invention relates to an aqueous cleaning composition comprising water and at least one organic solvent, wherein the cleaning composition has a hydrophobic cleaning efficiency of at least 90 percent achieved in less than 1,000 strokes. As used herein, the "hydrophobic cleaning efficiency" of a given composition refers to the ability of the composition to remove baked grease from an aluminum substrate according to the baked grease scrub test procedure outlined in Examples 2-4. The hydrophobic cleaning efficiency of a cleaning composition is measured by evaluating the percentage of the surface area of the aluminum substrate that has been cleaned of the baked grease as a result of the baked grease scrub test described in Examples 2-4 after a given number of strokes. The cleaning compositions of the present invention may have a hydrophobic cleaning efficiency of at least about 90 percent, at least about 95 percent, or at least about 97 percent achieved in less than 1,000 strokes and/or can have a hydrophobic cleaning efficiency of at least 90 percent achievable in less than about 950 strokes, less than about 900 strokes, less than about 850 strokes, less than about 800 strokes, less than about 750 strokes, less than about 700 strokes, or less than 650 strokes, measured according to the baked grease scrub test described in Examples 2-4.

Cleaning compositions according to the present invention may also have a hydrophilic cleaning efficiency of at least 90 percent achievable in less than 500 strokes. As used herein, the "hydrophilic cleaning efficiency" of a cleaning composition refers to the ability of the composition to remove soap scum from a painted wall board substrate according to the soap scum scrub test procedure outlined in Examples 2-4. Hydrophilic cleaning efficiency is measured by evaluating the percentage of the surface area of the painted wall board substrate that has been cleaned of the soap scum using the soap scum scrub test procedure described in Examples 2-4 after a given number of strokes. Cleaning compositions of the present invention may have a hydrophilic cleaning efficiency of at least about 90 percent, at least about 95 percent, or at least about 97 percent achieved in less than 500 strokes. Additionally, or in the alternative, cleaning compositions of the present invention can have a hydrophilic cleaning efficiency of at least 90 percent achievable in less than about 500 strokes, less than about 450 strokes, less than about 400 strokes, less than about 350 strokes, less than about 300 strokes, less than about 250 strokes, or less than about 200 strokes, less than about 150 strokes, less than about 125 strokes, less than about 100 strokes, measured according to the soap scum scrub test described in Examples 2-4.

The cleaning composition of the present invention may include at least 0.1 weight percent of the organic solvent, based on the total weight of the composition. The organic solvent may also be present in an amount of at least about 0.5 weight percent, at least about 1 weight percent, at least about 2 weight percent, at least about 3 weight percent, at least about 4 weight percent, at least about 5 weight percent and/or not more than about 99 weight percent, not more than about 90 weight percent, not more than about 80 weight percent, not more than about 70 weight percent, not more than about 60 weight percent, not more than about 50 weight percent, not more than about 40 weight percent, not more than about 30 weight percent, not more than about 20 weight percent, not more than about 15 weight percent, not more than about 10 weight percent, not more than about 5 weight percent, not more than about 4 weight percent, based on the total weight of the composition.

The organic solvent can be present in the cleaning composition in an amount in the range of from about 0.1 to about 99 weight percent, about 0.1 to about 90 weight percent, about 0.1 to about 80 weight percent, about 0.1 to about 70 weight percent, about 0.1 to about 60 weight percent, about 0.1 to about 50 weight percent, about 0.1 to about 40 weight percent, about 0.1 to about 30 weight percent, about 0.1 to about 20 weight percent, about 0.1 to about 15 weight percent, about 0.1 to about 10 weight percent, about 0.1 to about 5 weight percent, about 0.1 to about 4 weight percent, about 0.5 to about 99 weight percent, about 0.5 to about 90 weight percent, about 0.5 to about 80 weight percent, about 0.5 to about 70 weight percent, about 0.5 to about 60 weight percent, about 0.5 to about 50 weight percent, about 0.5 to about 40 weight percent, about 0.5 to about 30 weight percent, about 0.5 to about 20 weight percent, about 0.5 to about 15 weight percent, about 0.5 to about 10 weight percent, about 0.5 to about 5 weight percent, about 0.5 to about 4 weight percent, about 1 to about 99 weight percent, about 1 to about 90 weight percent, about 1 to about 80 weight percent, about 1 to about 70 weight percent, about 1 to about 60 weight percent, about 1 to about 50 weight percent, about 1 to about 40 weight percent, about 1 to about 30 weight percent, about 1 to about 20 weight percent, about 1 to about 15 weight percent, about 1 to about 10 weight percent, about 1 to about 5 weight percent, about 1 to about 4 weight percent, about 2 to about 99 weight percent, about 2 to about 90 weight percent, about 2 to about 80 weight percent, about 2 to about 70 weight percent, about 2 to about 60 weight percent, about 2 to about 50 weight percent, about 2 to about 40 weight percent, about 2 to about 30 weight percent, about 2 to about 20 weight percent, about 2 to about 15 weight percent, about 2 to about 10 weight percent, about 2 to about 5 weight percent, about 2 to about 4 weight percent, about 3 to about 99 weight percent, about 3 to about 90 weight percent, about 3 to about 80 weight percent, about 3 to about 70 weight percent, about 3 to about 60 weight percent, about 3 to about 50 weight percent, about 3 to about 40 weight percent, about 3 to about 30 weight percent, about 3 to about 20 weight percent, about 3 to about 15 weight percent, about 3 to about 10 weight percent, about 3 to about 5 weight percent, about 3 to about 4 weight percent, about 4 to about 99 weight percent, about 4 to about 90 weight percent, about 4 to about 80 weight percent, about 4 to about 70 weight percent, about 4 to about 60 weight percent, about 4 to about 50 weight percent, about 4 to about 40 weight percent, about 4 to about 30 weight percent, about 4 to about 20 weight percent, about 4 to about 15 weight percent, about 4 to about 10 weight percent, about 4 to about 5 weight percent, about 5 to about 99 weight percent, about 5 to about 90 weight percent, about 5 to about 80 weight percent, about 5 to about 70 weight percent, about 5 to about 60 weight percent, about 5 to about 50 weight percent, about 5 to about 40 weight percent, about 5 to about 30 weight percent, about 5 to about 20 weight percent, about 5 to about 15 weight percent, or about 5 to about 10 weight percent, based on the total weight of the composition. The amount of the organic solvent used in the cleaning composition may depend, in part, on the specific application, the type of substrate being cleaned, and/or type of soil being removed.

The organic solvent utilized in the cleaning compositions of the present invention may be a relatively low vapor pressure solvent having, for example, a vapor pressure, measured according to ASTM D1160 at 20° C., not more than about 0.20 torr, not more than about 0.18 torr, not more than about 0.16 torr, or not more than about 0.12 torr. In some cases, the organic solvent may have a vapor pressure at 20° C. of at least about 0.05 torr, at least about 0.055 torr, at least about 0.06 torr, and/or not more than about 0.10 torr, not more than about 0.09 torr, not more than about 0.08 torr, not more than about 0.075 torr. The organic solvent can have a vapor pressure, measured at 20° C., in the range of from about 0.05 to about 0.10 torr, about 0.05 to about 0.09 torr, about 0.05 to about 0.08 torr, about 0.05 to about 0.075 torr, about 0.055 to about 0.10 torr, about 0.055 to about 0.09 torr, about 0.055 to about 0.08 torr, about 0.055 to about 0.075 torr, about 0.06 to about 0.10 torr, about 0.06 to about 0.09 torr, about 0.06 to about 0.08 torr, about 0.06 to about 0.075 torr.

In some cases, the cleaning composition of the present invention may have a total of not more than about 10 weight percent, not more than about 8 weight percent, not more than about 6 weight percent, not more than about 5 weight percent, not more than about 4 weight percent, not more than about 3 weight percent, not more than about 2 weight percent, not more than about 1 weight percent, not more than about 0.5 weight percent of components having a vapor pressure greater than about 0.10 torr measured at 20° C.

The organic solvent can also have a boiling point measured at atmospheric pressure using a Mettler FP81 HT MBC cell equipped with photocell detection, of at least about 150° C., at least about 200° C., at least about 210° C., at least about 215° C., at least about 216° C., or at least about 217° C. and/or not more than about 230° C., not more than about 225° C., or not more than about 220° C. The normal boiling point of the organic solvent can be in the range of from about 150 to about 230° C., about 150 to about 225° C., about 150 to about 220° C., about 200 to about 230° C., about 200 to about 225° C., about 200 to about 220° C., about 210 to about 230° C., about 210 to about 225° C., about 210 to about 220° C., about 215 to about 230° C., about 215 to about 225° C., about 215 to about 220° C., about 216 to about 230° C., about 216 to about 225° C., about 216 to about 220° C., about 217 to about 230° C., about 217 to about 225° C., about 217 to about 220° C.

In addition to the properties described above, the organic solvent may have one or more of the properties described below.

The organic solvent can have a flash point measured by ASTM D7236-07 with a Setaflash closed cup instrument, of at least about 80° C., at least about 85° C., at least about 90° C., at least about 95° C. and/or not more than about 115° C., not more than about 110° C., not more than about 105° C. and/or may have an auto-ignition temperature, measured according to ASTM E659-78 (2005), of at least about 290° C., at least about 295° C., at least about 300° C. and/or not more than about 345° C., not more than about 335° C., or not more than about 330° C. The organic solvent of the cleaning composition may have a flash point in the range of from about 80 to about 115° C., about 80 to about 110° C., about 80 to about 105° C., about 85 to about 115° C., about 85 to about 110° C., about 85 to about 105° C., about 90 to about 115° C., about 90 to about 110° C., about 90 to about 105° C., from about 95 to about 115° C., about 95 to about 110° C., or about 95 to about 105° C. and/or an auto-ignition temperature in the range of from about 290 to about 345° C., about 290 to about 335° C., about 290 to about 330° C., about 295 to about 345° C., about 295 to about 335° C., about 295 to about 330° C., about 300 to about 345° C., about 300 to about 335° C., or about 300 to about 330° C.

The organic solvent may also have a density measured at 20° C. using ASTM D4052-11, of at least about 0.955 g/mL, at least about 0.960 g/mL, at least about 0.965 g/mL, at least about 0.970 g/mL and/or not more than about 0.985 g/mL, not more than about 0.980 g/mL, or not more than about 0.975 g/mL. The organic solvent may have a density in the range of from about 0.955 to about 0.985 g/mL, about 0.955 to about 0.980 g/mL, about 0.955 to 0.975 g/mL, 0.960 to about 0.985 g/mL, about 0.960 to about 0.980 g/mL, about 0.960 to 0.975 g/mL, 0.965 to about 0.985 g/mL, about 0.965 to about 0.980 g/mL, about 0.965 to 0.975 g/mL, 0.970 to about 0.985 g/mL, about 0.970 to about 0.980 g/mL, about 0.970 to 0.975 g/mL.

The organic solvent can have a solubility limit in deionized water at 23° C. of at least about 2 weight percent, at least about 2.5 weight percent, at least about 3 weight percent, at least about 3.5 weight percent, at least about 3.75 weight percent and/or not more than about 20 weight percent, not more than about 15 weight percent, not more than about 10 weight percent, not more than about 5 weight percent. The solubility limit of the organic solvent in deionized water at 23° C. can be in the range of from about 2 to about 20 weight percent, about 2 to about 15 weight percent, about 2 to about 10 weight percent, about 2 to about 5 weight percent, about 2.5 to about 20 weight percent, about 2.5 to about 15 weight percent, about 2.5 to about 10 weight percent, about 2.5 to about 5 weight percent, about 3 to about 20 weight percent, about 3 to about 15 weight percent, about 3 to about 10 weight percent, about 3 to about 5 weight percent, about 3.5 to about 20 weight percent, about 3.5 to about 15 weight percent, about 3.5 to about 10 weight percent, about 3.5 to about 5 weight percent, about 3.75 to about 20 weight percent, about 3.75 to about 15 weight percent, about 3.75 to about 10 weight percent, about 3.75 to about 5 weight percent.

The solubility limit of deionized water at 23° C. in the organic solvent may be at least about 6 weight percent, at least about 8 weight percent, at least about 10 weight percent and/or not more than about 25 weight percent, not more than about 20 weight percent, not more than about 12 weight percent. The solubility limit of deionized water at 23° C. in the organic solvent can be in the range of from about 6 to about 25 weight percent, about 6 to about 15 weight percent, about 6 to about 12 weight percent, about 8 to about 25 weight percent, about 8 to about 15 weight percent, about 8 to about 12 weight percent, about 10 to about 25 weight percent, about 10 to about 15 weight percent, about 10 to about 12 weight percent.

Additionally, the organic solvent may be described by one or more of the following Hansen solubility parameters. For example, the organic solvent may have a Hansen polar solubility parameter ($\sigma_p$ or "P parameter") of at least about 2.50 $(cal/cm^3)^{1/2}$, at least about 2.75 $(cal/cm^3)^{1/2}$, at least about 2.80 $(cal/cm^3)^{1/2}$, at least about 2.95 $(cal/cm^3)^{1/2}$, at least about 3.00 $(cal/cm^3)^{1/2}$, at least about 3.10 $(cal/cm^3)^{1/2}$ and/or not more than about 3.4 $(cal/cm^3)^{1/2}$, not more than about 3.30 $(cal/cm^3)^{1/2}$, not more than about 3.25 $(cal/cm^3)^{1/2}$, calculated using the "Hansen Solubility Parameters in Practice" software package $3^{rd}$ ed., version 3.1, by S. Abbott and C. Hansen.

The Hansen polar solubility parameter, which measures the permanent dipole moment and permanent dipole interactions of a molecule, can be in the range of from about 2.5 to about 3.4 $(cal/cm^3)^{1/2}$, about 2.5 to about 3.3 $(cal/cm^3)^{1/2}$, about 2.5 to about 3.25 $(cal/cm^3)^{1/2}$, 2.75 to about 3.4 $(cal/cm^3)^{1/2}$, about 2.75 to about 3.3 $(cal/cm^3)^{1/2}$, about 2.75 to about 3.25 $(cal/cm^3)^{1/2}$, 2.8 to about 3.4 $(cal/cm^3)^{1/2}$, about 2.8 to about 3.3 $(cal/cm^3)^{1/2}$, about 2.8 to about 3.25 $(cal/cm^3)^{1/2}$, 2.95 to about 3.4 $(cal/cm^3)^{1/2}$, about 2.95 to about 3.3 $(cal/cm^3)^{1/2}$, about 2.95 to about 3.25 $(cal/cm^3)^{1/2}$, 3.0 to about 3.4 $(cal/cm^3)^{1/2}$, about 3.0 to about 3.3 $(cal/cm^3)^{1/2}$, about 3.0 to about 3.25 $(cal/cm^3)^{1/2}$, 3.1 to about 3.4 $(cal/ cm³)¹ᐟ², about 3.1 to about 3.3 (cal/cm³)¹ᐟ², about 3.1 to about 3.25 (cal/cm³)¹ᐟ² for the organic solvent.

The organic solvent can have a Hansen hydrogen bonding solubility parameter ($\sigma_h$ or "H parameter") of at least about 5.40 (cal/cm³)¹ᐟ², at least about 5.40 (cal/cm³)¹ᐟ², at least about 5.60 (cal/cm³)¹ᐟ², at least about 5.65 (cal/cm³)¹ᐟ², at least about 5.70 (cal/cm³)¹ᐟ² and/or not more than about 6.10 (cal/cm³)¹ᐟ², not more than about 5.95 (cal/cm³)¹ᐟ², not more than about 5.90 (cal/cm³)¹ᐟ², not more than about 5.85 (cal/cm³)¹ᐟ², calculated as described above.

The Hansen hydrogen bonding solubility parameter, which measures electron exchange, can be in the range of from about 5.40 to about 6.10 (cal/cm³)¹ᐟ², about 5.40 to about 5.95 (cal/cm³)¹ᐟ², about 5.40 to about 5.90 (cal/cm³)¹ᐟ², about 5.40 to about 5.85 (cal/cm³)¹ᐟ² about 5.60 to about 6.10 (cal/cm³)¹ᐟ², about 5.60 to about 5.95 (cal/cm³)¹ᐟ², about 5.60 to about 5.90 (cal/cm³)¹ᐟ², about 5.60 to about 5.85 (cal/cm³)¹ᐟ², about 5.65 to about 6.10 (cal/cm³)¹ᐟ², about 5.65 to about 5.95 (cal/cm³)¹ᐟ², about 5.65 to about 5.90 (cal/cm³)¹ᐟ², about 5.65 to about 5.85 (cal/cm³)¹ᐟ², about 5.70 to about 6.10 (cal/cm³)¹ᐟ², about 5.70 to about 5.95 (cal/cm³)¹ᐟ², about 5.70 to about 5.90 (cal/cm³)¹ᐟ², about 5.70 to about 5.85 (cal/cm³)¹ᐟ² for the organic solvent.

The organic solvent can have a Hansen dispersion solubility parameter ($\sigma_d$ or "D parameter") of at least about 7.50 (cal/cm³)¹ᐟ², at least about 7.75 (cal/cm³)¹ᐟ², at least about 8.00 (cal/cm³)¹ᐟ², at least about 8.03 (cal/cm³)¹ᐟ² and/or not more than about 8.15 (cal/cm³)¹ᐟ², not more than about 8.10 (cal/cm³)¹ᐟ², not more than about 8.05 (cal/cm³)¹ᐟ², not more than about 8.00 (cal/cm³)¹ᐟ², calculated as described above.

The Hansen dispersion solubility parameter, which measures nonpolar interactions derived from atomic forces, of the organic solvent can be in the range of from about 7.50 to about 8.15 (cal/cm³)¹ᐟ², about 7.50 to about 8.10 (cal/cm³)¹ᐟ², about 7.50 to about 8.05 (cal/cm³)¹ᐟ², about 7.50 to about 8.0 (cal/cm³)¹ᐟ², about 7.75 to about 8.15 (cal/cm³)¹ᐟ², about 7.75 to about 8.10 (cal/cm³)¹ᐟ², about 7.75 to about 8.05 (cal/cm³)¹ᐟ², about 7.75 to about 8.0 (cal/cm³)¹ᐟ², about 8.0 to about 8.15 (cal/cm³)¹ᐟ², about 8.0 to about 8.10 (cal/cm³)¹ᐟ², about 8.0 to about 8.05 (cal/cm³)¹ᐟ², about 8.03 to about 8.15 (cal/cm³)¹ᐟ², about 8.03 to about 8.10 (cal/cm³)¹ᐟ², about 8.03 to about 8.05 (cal/cm³)¹ᐟ².

The organic solvent can have a total Hansen solubility parameter of at least about 10.1 (cal/cm³)¹ᐟ², at least about 10.2 (cal/cm³)¹ᐟ², at least about 10.25 (cal/cm³)¹ᐟ², at least about 10.3 (cal/cm³)¹ᐟ² and/or not more than about 10.5 (cal/cm³)¹ᐟ², not more than about 10.45 (cal/cm³)¹ᐟ², not more than about 10.40 (cal/cm³)¹ᐟ², calculated as described above. The total Hansen solubility parameter of the organic solvent can be in the range of from about 10.1 to about 10.5 (cal/cm³)¹ᐟ², about 10.1 to about 10.45 (cal/cm³)¹ᐟ², about 10.1 to about 10.40 (cal/cm³)¹ᐟ², about 10.2 to about 10.5 (cal/cm³)¹ᐟ², about 10.2 to about 10.45 (cal/cm³)¹ᐟ², about 10.2 to about 10.40 (cal/cm³)¹ᐟ², about 10.25 to about 10.5 (cal/cm³)¹ᐟ², about 10.25 to about 10.45 (cal/cm³)¹ᐟ², about 10.25 to about 10.40 (cal/cm³)¹ᐟ², about 10.3 to about 10.5 (cal/cm³)¹ᐟ², about 10.3 to about 10.45 (cal/cm³)¹ᐟ², about 10.3 to about 10.40 (cal/cm³)¹ᐟ².

The organic solvent can have a surface tension, measured using the ring pull method with a Krüss K100 tensiometer, of at least about 24.5 dynes/cm, at least about 25.0 dynes/cm, at least about 25.5 dynes/cm, and/or not more than about 30 dynes/cm, not more than about 29 dynes/cm, not more than about 28 dynes/cm, not more than about 27 dynes/cm, not more than about 26.5 dynes/cm. The surface tension of the organic solvent can be in the range of from about 24.5 to about 30 dynes/cm, about 24.5 to about 29 dynes/cm, about 24.5 to about 28 dynes/cm, about 24.5 to about 27 dynes/cm, about 24.5 to about 26.5 dynes/cm, about 25 to about 30 dynes/cm, about 25 to about 29 dynes/cm, about 25 to about 28 dynes/cm, about 25 to about 27 dynes/cm, about 25 to about 26.5 dynes/cm, about 25.5 to about 30 dynes/cm, about 25.5 to about 29 dynes/cm, about 25.5 to about 28 dynes/cm, about 25.5 to about 27 dynes/cm, about 25.5 to about 26.5 dynes/cm.

The organic solvent may also have the ability to bring together and homogenize two immiscible liquids, for example, an oil and water. This ability is called "coupling efficiency" and can be measured by adding the test solvent to 1.0 gram of an oil and 1.0 gram of de-ionized water with vigorous stirring or shaking until the mixture becomes clear. The result can then be expressed as the number of grams of solvent divided by the total grams of oil and water. The organic solvent can have a corn oil-water coupling efficiency measured at 23° C. of at least about 5 grams of organic solvent per total grams of oil and water (g/g), at least about 6 g/g, at least about 7 g/g and/or not more than about 15 g/g, not more than about 12 g/g, or not more than about 10 g/g. The organic solvent may also have a corn oil-water coupling efficiency in the range of from about 5 to about 15 g/g, about 5 to about 12 g/g, about 5 to about 10 g/g, about 6 to about 15 g/g, about 6 to about 12/g/g, about 6 to about 10 g/g, about 7 to about 15 g/g, about 7 to about 12 g/g, about 7 to about 10 g/g.

The organic solvent can comprise an ester and may comprise an alkyl ester. The alkyl group of the alkyl ester may include at least 3 and not more than 5 carbon atoms. As used herein, the term "alkyl group," refers to a branched or straight-chain monovalent alkyl radical. The alkyl group may include 3 or 4 carbon atoms or may include 4 carbon atoms. The organic solvent can comprise an alkyl hydroxybutyrate and may, in some cases, be an alkyl 3-hydroxybutyrate defined by the following formula:

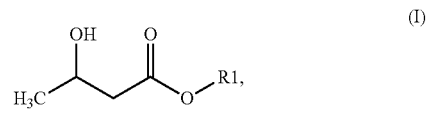

wherein R1 is an alkyl group comprising at least 3 and not more than 5 carbon atoms. The R1 group may be selected from the group consisting of isopropyl, n-propyl, isobutyl, n-butyl, 2-butyl (sec-butyl), 2,2-dimethylethyl (tert-butyl), 3,3-dimethylpentyl (isopentyl), 1-pentyl (n-pentyl), 1-methylbutyl(2-pentyl), 2-methylbutyl, 2-ethylpropyl(3-pentyl), 1,1-dimethylpropyl, 1,2-dimethylpropyl, 2,2-dimethylpropyl (neopentyl), and cyclopentyl, or may be selected from the group consisting of isopropyl, n-propyl, isobutyl, n-butyl, and 2-butyl. In some cases, the alkyl group R1 may be selected from the group consisting of isopropyl, isobutyl, n-butyl, and 2-butyl or the group consisting of isobutyl, n-butyl, and 2-butyl. Also, the R1 group can be n-butyl. The alkyl 3-hydroxybutyrate may be present as a single enantiomer, a mixture of enantiomers enriched in one enantiomer, a single diastereiomer, a mixture enriched in one diastereiomer, or as a racemic mixture. The alkyl 3-hydroxybutyrate may be non-halogenated.

When the organic solvent comprises an alkyl 3-hydroxybutyrate, the alkyl 3-hydroxybutyrate can originate from any suitable source and/or can be synthesized by any suitable method. It may, for example, originate from a biological source and be obtained by alcoholysis of a poly-3-hydroxybutyrate (PHB) extracted from plant matter or other biological materials. It may be synthesized directly by esterification of 3-hydroxybutyric acid or by transesterification of a different 3-hydroxybutric acid ester, for example, methyl 3-hydroxybutyrate, and an alkanol in the presence of an aprotic catalyst, for example, a dialkyl tin oxide. Alternatively, the alkyl 3-hydroxybutyrate may be prepared by reducing an alkyl acetoacetate, for example, in the presence of hydrogen and a hydrogenation catalyst.

The water may be present in the aqueous cleaning composition in an amount of at least about 30 weight percent, at least about 35 weight percent, at least about 40 weight percent, at least about 45 weight percent, at least about 50 weight percent, at least about 55 weight percent, at least about 60 weight percent, at least about 65 weight percent, at least about 70 weight percent, at least about 75 weight percent, and/or not more than about 99.9 weight percent, not more than about 95 weight percent, not more than about 90 weight percent, not more than about 85 weight percent, not more than about 80 weight percent, based on the total weight of the cleaning composition.

Water may be present in the cleaning composition in an amount in the range of from about 30 to about 99.9 weight percent, about 30 to about 95 weight percent, about 30 to about 90 weight percent, about 30 to about 85 weight percent, about 30 to about 80 weight percent, 35 to about 99.9 weight percent, about 35 to about 95 weight percent, about 35 to about 90 weight percent, about 35 to about 85 weight percent, about 35 to about 80 weight percent, 40 to about 99.9 weight percent, about 40 to about 95 weight percent, about 40 to about 90 weight percent, about 40 to about 85 weight percent, about 40 to about 80 weight percent, 45 to about 99.9 weight percent, about 45 to about 95 weight percent, about 45 to about 90 weight percent, about 45 to about 85 weight percent, about 45 to about 80 weight percent, about 50 to about 99.9 weight percent, about 50 to about 95 weight percent, about 50 to about 90 weight percent, about 50 to about 85 weight percent, about 50 to about 80 weight percent, about 55 to about 99.9 weight percent, about 55 to about 95 weight percent, about 55 to about 90 weight percent, about 55 to about 85 weight percent, about 55 to about 80 weight percent, about 60 to about 99.9 weight percent, about 60 to about 95 weight percent, about 60 to about 90 weight percent, about 60 to about 85 weight percent, about 60 to about 80 weight percent, about 65 to about 99.9 weight percent, about 65 to about 95 weight percent, about 65 to about 90 weight percent, about 65 to about 85 weight percent, about 65 to about 80 weight percent, about 70 to about 99.9 weight percent, about 70 to about 95 weight percent, about 70 to about 90 weight percent, about 70 to about 85 weight percent, about 70 to about 80 weight percent, based on the total weight of the composition.

The ratio, by weight, of the organic solvent to water in the cleaning composition may be at least about 0.001:1, at least about 0.002:1, at least about 0.005:1, at least about 0.1:10:1, at least about 0.020:1 and/or not more than about 0.50:1, not more than about 0.25:1, not more than about 0.20:1, not more than about 0.10:1, not more than about 0.05:1, not more than about 0.035:1, or in the range of from about 0.001:1 to about 0.50:1, about 0.001:1 to about 0.25:1, about 0.001:1 to about 0.20:1, about 0.001:1 to about 0.10:1, about 0.001:1 to about 0.05:1, about 0.001:1 to about 0.035:1, about 0.002:1 to about 0.50:1, about 0.002:1 to about 0.25:1, about 0.002:1 to about 0.20:1, about 0.002:1 to about 0.10:1, about 0.002:1 to about 0.05:1, about 0.002:1 to about 0.035:1, about 0.005:1 to about 0.50:1, about 0.005:1 to about 0.25:1, about 0.005:1 to about 0.20:1, about 0.005:1 to about 0.10:1, about 0.005:1 to about 0.05:1, about 0.005:1 to about 0.035:1, about 0.010:1 to about 0.50:1, about 0.010:1 to about 0.25:1, about 0.010:1 to about 0.20:1, about 0.010:1 to about 0.10:1, about 0.010:1 to about 0.05:1, about 0.010:1 to about 0.035:1, about 0.020:1 to about 0.50:1, about 0.020:1 to about 0.25:1, about 0.020:1 to about 0.20:1, about 0.020:1 to about 0.10:1, about 0.020:1 to about 0.05:1, about 0.020:1 to about 0.035:1.

The water may be any type of water suitable for use in a cleaning composition and can originate from several sources. For example, the water can include tap water, filtered water, bottled water, spring water, distilled water, deionized water, and/or industrial soft water. If the water is hard water comprising organics and/or dissolved mineral salts or metals, it may be purified to remove all or at least a portion of these components, which may interfere with the operation of the other components of the cleaning composition.

The cleaning composition may include not more than about 10 weight percent, not more than about 8 weight percent, not more than about 5 weight percent, not more than about 2 weight percent, not more than about 1 weight percent, not more than about 0.5 weight percent, not more than about 0.1 weight percent of components other than water and the organic solvent, based on the total weight of the composition. In other cases, the composition may consist essentially of water and the organic solvent. In this case, the organic solvent may be present in the cleaning composition in an amount of not more than about 5 weight percent, not more than about 4.5 weight percent, or not more than about 4 weight percent, based on the total weight of the composition. The cleaning composition may also comprise not more than about 10 weight percent, not more than about 8 weight percent, not more than about 6 weight percent, not more than about 5 weight percent, not more than about 4 weight percent, not more than about 3 weight percent, not more than about 2 weight percent, not more than about 1 weight percent, not more than about 0.5 weight percent of one or more components having a vapor pressure greater than about 0.10 torr measured at 20° C.

Cleaning compositions of the present invention may also include at least one surfactant. As used herein, the term "surfactant," refers to a compound that reduces surface tension when dissolved in water or water solutions or that reduces the interfacial tension between two liquids or between a liquid and a solid. The surfactant, when present alone or as a system comprising two or more surfactants, may be included in the cleaning composition in an amount of at least about 0.01 weight percent, at least about 0.05 weight percent, at least about 1 weight percent, at least about 1.5 weight percent, at least about 2 weight percent and/or not more than about 15 weight percent, not more than about 10 weight percent, not more than about 8 weight percent, not more than about 6 weight percent, not more than about 4 weight percent, based on the total weight of the composition.

The surfactant may be present in the composition in an amount in the range of about 0.01 weight percent to about 15 weight percent, about 0.01 to about 10 weight percent, about 0.01 to about 8 weight percent, about 0.01 to about 6 weight percent, about 0.01 to about 4 weight percent, about 0.05 to about 15 weight percent, about 0.05 to about 10 weight percent, about 0.05 to about 8 weight percent, about 0.05 to about 6 weight percent, about 0.05 to about 4 weight percent, about 1 to about 15 weight percent, about 1 to about 10 weight percent, about 1 to about 8 weight percent, about 1 to about 6 weight percent, about 1 to about 4 weight percent, about 1.5 to about 15 weight percent, about 1.5 to about 10 weight percent, about 1.5 to about 8 weight percent, about 1.5 to about 6 weight percent, about 1.5 to about 4 weight percent, about 2 to about 15 weight percent, about 2 to about 10 weight percent, about 2 to about 8 weight percent, about 2 to about 6 weight percent, about 2 to about 4 weight percent, based on the total weight of the composition.

The ratio, by weight, of the organic solvent to surfactant in the cleaning composition may be at least about 0.01:1, at least about 0.05:1, at least about 0.10:1, at least about 0.5:1 and/or not more than about 150:1, not more than about 100:1, not more than about 50:1, not more than about 25:1, not more than about 10:1, not more than about 5:1, or in the range of from about 0.01:1 to about 150:1, about 0.01:1 to about 100:1, about 0.01:1 to about 50:1, about 0.01:1 to about 25:1, about 0.01:1 to about 10:1, about 0.01:1 to about 5:1, about 0.05:1 to about 150:1, about 0.05:1 to about 100:1, about 0.05:1 to about 50:1, about 0.05:1 to about 25:1, about 0.05:1 to about 10:1, about 0.05:1 to about 5:1, about 0.10:1 to about 150:1, about 0.10:1 to about 100:1, about 0.10:1 to about 50:1, about 0.10:1 to about 25:1, about 0.10:1 to about 10:1, about 0.10:1 to about 5:1, about 0.5:1 to about 150:1, about 0.5:1 to about 100:1, about 0.5:1 to about 50:1, about 0.5:1 to about 25:1, about 0.5:1 to about 10:1, about 0.5:1 to about 5:1.

The ratio, by weight, of organic solvent to the total amount of water and surfactant in the cleaning composition can be at least about 0.001:1, at least about 0.002:1, at least about 0.005:1, at least about 0.010:1 and/or not more than about 0.25:1, not more than about 0.10:1, not more than about 0.05:1, or in the range of from about 0.001:1 to about 0.25:1, about 0.001:1 to about 0.10:1, about 0.001:1 to about 0.05:1, about 0.002:1 to about 0.25:1, about 0.002:1 to about 0.10:1, about 0.002:1 to about 0.05:1, about 0.005:1 to about 0.25:1, about 0.005:1 to about 0.10:1, about 0.005:1 to about 0.05:1, about 0.010:1 to about 0.25:1, about 0.010:1 to about 0.10:1, about 0.010:1 to about 0.05:1.

The surfactant can comprise a nonionic, cationic, anionic, amphoteric, or zwitterionic surfactant. When two or more surfactants are present in the cleaning composition, at least one of the surfactants may be of a different type than one or more of the other surfactants. Alternatively, all of the surfactants in a system comprising two or more surfactants can be of the same type. The surfactant can have a hydrophilic-lipophilic balance (HLB) value of at least about 3, at least about 4, at least about 5, at least about 6, at least about 7, at least about 8 and/or not more than about 19, not more than about 18, or not more than about 17, not more than about 16, not more than about 15, not more than about 14, as determined by Griffin's Method. The HLB value of the surfactant can be in the range of from about 3 to about 19, about 3 to about 18, about 3 to about 17, about 3 to about 16, about 3 to about 15, about 3 to about 14, about 4 to about 19, about 4 to about 18, about 4 to about 17, about 4 to about 16, about 4 to about 15, about 4 to about 14, about 5 to about 19, about 5 to about 18, about 5 to about 17, about 5 to about 16, about 5 to about 15, about 5 to about 14, about 6 to about 19, about 6 to about 18, about 6 to about 17, about 6 to about 16, about 6 to about 15, about 6 to about 14, about 7 to about 19, about 7 to about 18, about 7 to about 17, about 7 to about 16, about 7 to about 15, about 7 to about 14, about 8 to about 19, about 8 to about 18, about 8 to about 17, about 8 to about 16, about 8 to about 15, about 8 to about 14. A list of HLB values for a variety of suitable surfactants is available in *McCutcheon's Emulsifiers & Detergents,* North American and International Edition, MC Publishing Company, 1993. The HLB value of a particular surfactant may be a function of its ionic nature.

The surfactant may be an anionic surfactant comprising, for example, an alkylbenzene sulfonate, α-olefin sulfonate, paraffin sulfonate, alkyl ester sulfonate, alkyl sulfate, alkyl alkoxy sulfate, alkyl sulfonate, alkyl alkoxy carboxylate, monoalkyl phosphate, dialkyl phosphate, sarcosinate, sulfosuccinate, isethionate, taurate, or combinations thereof. Some commonly used anionic surfactants that are suitable as the anionic surfactant component of the cleaning composition of the present invention include, for example, ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium lauryl sulfate, potassium laureth sulfate, sodium-monoalkyl phosphates, sodium dialkyl phosphates, sodium lauroyl sarcosinate, lauroyl sarcosine, cocoyl sarcosine, ammonium cocyl sulfate, sodium cocyl sulfate, sodium trideceth sulfate, sodium tridecyl sulfate, ammonium trideceth sulfate, ammonium tridecyl sulfate, sodium cocoyl isethionate, disodium laureth sulfosuccinate, sodium methyl oleoyl taurate, sodium laureth carboxylate, sodium trideceth carboxylate, potassium cocyl sulfate, monoethanolamine cocyl sulfate, sodium tridecyl benzene sulfonate, and sodium dodecyl benzene sulfonate.

The surfactant may comprise a nonionic surfactant. Examples of nonionic surfactants include, but are not limited to, alkyl polyglucosides, fatty alcohols, glycols, glycol esters, alkyl carboxylic acid esters, alcohol alkoxylates, alkyl phenol alkoxylates, nonylphenol ethoxylates, alkyl ethanolamides, amine oxides, terpene alkoxylates, or combinations thereof. Some additional examples of nonionic surfactants include ethoxylated alkanolamides, ethylene bisamides; fatty acid esters, glycerol esters, ethoxylated fatty acid esters, sorbitan esters, ethoxylated sorbitan, tristyrylphenol ethoxylates, mercaptan ethoxylates; end-capped and EO/PO block copolymers such as ethylene oxide/propylene oxide block copolymers; chlorine capped ethoxylates, tetra-functional block copolymers, lauramine oxide, cocamine oxide, stearamine oxide, stearamidopropylamine oxide, palmitamidopropylamine oxide, decylamine oxide; decyl alcohol, lauryl alcohol, tridecyl alcohol, myristyl alcohol, cetyl alcohol, stearyl alcohol, oleyl alcohol, linoleyl alcohol and linolenyl alcohol, ethoxylated lauryl alcohol, trideceth alcohols, lauric acid, oleic acid, stearic acid, myristic acid, cetearic acid, isostearic acid, linoleic acid, linolenic acid, ricinoleic acid, elaidic acid, arichidonic acid, myristoleic acid, and combinations thereof. In one embodiment, for example, the non-ionic surfactant may comprise a glycol such as polyethylene glycol, polypropylene glycol or derivatives thereof. In another embodiment, the non-ionic surfactant can comprise one or more alkyl polyethylene glycol esters.

The surfactant may comprise a cationic surfactant including a quaternary ammonium compound. Some representative examples of quaternary ammonium compounds include cetyl trimethyl ammonium bromide (also known as CETAB or cetrimonium bromide), cetyl trimethyl ammonium chloride (also known as cetrimonium chloride), myristyl trimethyl ammonium bromide (also known as myrtrimonium bromide or quatemium-13), stearyl dimethyl distearyldimonium chloride, dicetyl dimonium chloride, stearyl octyldimonium methosulfate, dihydrogenated palmoylethyl hydroxyethylmonium methosulfate, isostearyl benzylimidonium chloride, cocoyl benzyl hydroxyethyl imidazolinium chloride, dicetyl dimonium chloride, distearyldimonium chloride, isostearylaminopropalkonium chloride, olealkonium chloride, behentrimonium chloride, and combinations thereof.

The surfactant may comprise an amphoteric surfactant that comprises an alkali metal, alkaline earth metal, ammonium salt of an alkyl amphocarboxy glycinate, substituted ammonium salt of an alkyl amphocarboxy glycinate, alkyl amphocarboxypropionate, alkyl amphodipropionate, alkyl amphodiacetate, alkyl amphoglycinate, alkyl amphopropionate, alkyl iminopropionate, alkyl iminodipropionate, alkyl amphopropylsulfonate, or combinations thereof. Some specific examples of amphoteric surfactants include cocoamphoacetate, cocoamphopropionate, cocoamphodiacetate, lauroamphoacetate, lauroamphodiacetate, lauroamphodipropionate, lauroamphodiacetate, cocoamphopropyl sulfonate caproamphodiacetate, caproamphoacetate, caproamphodipropionate, and stearoamphoacetate.

The surfactant may comprise a zwitterionic surfactant comprising an alkyl betaine, sulfobetaine, imidazoline, propinate, or combinations thereof. Some examples of zwitterionic surfactants include, but are not limited to, cocodimethyl carboxymethyl betaine, lauryl dimethyl carboxymethyl betaine, lauryl dimethyl α-carboxy-ethyl betaine, cetyl dimethyl carboxymethyl betaine, lauryl bis-(2-hydroxy-ethyl) carboxy methyl betaine, stearyl bis-(2-hydroxy-propyl)carboxymethyl betaine, oleyl dimethyl gamma-carboxypropyl betaine, and lauryl bis-(2-hydroxypropyl) α-carboxyethyl betaine, amidopropyl betaines, and alkyl sultaines, such as cocodimethyl sulfopropyl betaine, stearyldimethyl sulfopropyl betaine, lauryl dimethyl sulfoethyl betaine, lauryl bis-(2-hydroxy-ethyl)sulfopropyl betaine, and alkylamidopropyl-hydroxy sultaines.

The cleaning composition may include only trace amounts of components other than the surfactant, water, and organic solvent. For example, the cleaning composition can include not more than about 10 weight percent, not more than about 8 weight percent, not more than about 6 weight percent, not more than about 5 weight percent, not more than about 4 weight percent, not more than about 3 weight percent, not more than about 2 weight percent, not more than about 1 weight percent, not more than about 0.5 weight percent, not more than about 0.25 weight percent of one or more components other than the organic solvent, water, and at least one surfactant, based on the total weight of the composition.

The cleaning composition may, however, include one or more additives in addition to the organic solvent, water, and an optional surfactant. These additional components may include one or more additional components, or additives, used to impart additional functionality, properties, or characteristics to the final composition. When present, the additives can be selected from the group consisting of co-solvents, complexing agents, dyes, fragrances, perfumes, pH stabilizers, acidifiers, preservatives, defoaming agents, metal protectants, antioxidants, bactericides, fungicides, disinfectants, thickeners, fine or coarse grits, polymers, buffers, delaminates, whiteners, brighteners, solubilizers, builders, corrosion inhibitors, lotions, mineral oils, cloud point modifiers, ion exchangers, sudsing control agents, soil removal agents, softening agents, opacifiers, inert diluents, graying inhibitors, enzymes, and combinations thereof.

The one or more additional components may be present in the cleaning compositions of the present invention in an amount of at least about 0.001 weight percent, at least about 0.005 weight percent, at least about 0.01 weight percent, at least about 0.05 weight percent, at least about 0.10 weight percent, at least about 0.15 weight percent, at least about 0.50 weight percent, at least about 1 weight percent, at least about 1.5 weight percent, at least about 2 weight percent and/or not more than about 40 weight percent, not more than about 35 weight percent, not more than about 30 weight percent, not more than about 25 weight percent, not more than about 20 weight percent, not more than about 15 weight percent, not more than about 10 weight percent, not more than about 8 weight percent, not more than about 5 weight percent, not more than about 4 weight percent, not more than about 3 weight percent, not more than about 2 weight percent, not more than about 1 weight percent, based on the total weight of the composition.

The additives may be present in the cleaning composition in an amount in the range of from about 0.001 to about 40 weight percent, 0.001 to about 35 weight percent, 0.001 to about 30 weight percent, 0.001 to about 25 weight percent, about 0.001 to about 20 weight percent, about 0.001 to about 15 weight percent, about 0.001 to about 10 weight percent, about 0.001 to about 8 weight percent, about 0.001 to about 5 weight percent, about 0.001 to about 4 weight percent, about 0.001 to about 3 weight percent, about 0.001 to about 2 weight percent, about 0.001 to about 1 weight percent, about 0.005 to about 40 weight percent, 0.005 to about 35 weight percent, 0.005 to about 30 weight percent, 0.005 to about 25 weight percent, about 0.005 to about 20 weight percent, about 0.005 to about 15 weight percent, about 0.005 to about 10 weight percent, about 0.005 to about 8 weight percent, about 0.005 to about 5 weight percent, about 0.005 to about 4 weight percent, about 0.005 to about 3 weight percent, about 0.005 to about 2 weight percent, about 0.005 to about 1 weight percent, about 0.01 to about 40 weight percent, 0.01 to about 35 weight percent, 0.01 to about 30 weight percent, 0.01 to about 25 weight percent, about 0.01 to about 20 weight percent, about 0.01 to about 15 weight percent, about 0.01 to about 10 weight percent, about 0.01 to about 8 weight percent, about 0.01 to about 5 weight percent, about 0.01 to about 4 weight percent, about 0.01 to about 3 weight percent, about 0.01 to about 2 weight percent, about 0.01 to about 1 weight percent, about 0.05 to about 40 weight percent, 0.05 to about 35 weight percent, 0.05 to about 30 weight percent, 0.05 to about 25 weight percent, about 0.05 to about 20 weight percent, about 0.05 to about 15 weight percent, about 0.05 to about 10 weight percent, about 0.05 to about 8 weight percent, about 0.05 to about 5 weight percent, about 0.05 to about 4 weight percent, about 0.05 to about 3 weight percent, about 0.05 to about 2 weight percent, about 0.05 to about 1 weight percent, about 0.10 to about 40 weight percent, 0.10 to about 35 weight percent, 0.10 to about 30 weight percent, 0.10 to about 25 weight percent, about 0.10 to about 20 weight percent, about 0.10 to about 15 weight percent, about 0.10 to about 10 weight percent, about 0.10 to about 8 weight percent, about 0.10 to about 5 weight percent, about 0.10 to about 4 weight percent, about 0.10 to about 3 weight percent, about 0.10 to about 2 weight percent, about 0.10 to about 1 weight percent, about 0.15 to about 40 weight percent, 0.15 to about 35 weight percent, 0.15 to about 30 weight percent, 0.15 to about 25 weight percent, about 0.15 to about 20 weight percent, about 0.15 to about 15 weight percent, about 0.15 to about 10 weight percent, about 0.15 to about 8 weight percent, about 0.15 to about 5 weight percent, about 0.15 to about 4 weight percent, about 0.15 to about 3 weight percent, about 0.15 to about 2 weight percent, about 0.15 to about 1 weight percent, about 0.50 to about 40 weight percent, about 0.50 to about 35 weight percent, about 0.50 to about 30 weight percent, about 0.50 to about 25 weight percent, about 0.50 to about 20 weight percent, about 0.50 to about 15 weight percent, about 0.50 to about 10 weight percent, about 0.50 to about 8 weight percent, about 0.50 to about 5 weight percent, about 0.50 to about 4 weight percent, about 0.50 to about 3 weight percent, about 0.50 to about 2 weight percent, about 0.50 to about 1 weight percent, about 1 to about 40 weight percent, 1 to about 35 weight percent, 1 to about 30 weight percent, 1 to about 25 weight percent, about 1 to about 20 weight percent, about 1 to about 15 weight percent, about 1 to about 10 weight percent, about 1 to about 8 weight percent, about 1 to about 5 weight percent, about 1 to about 4 weight percent, about 1 to about 3 weight percent, about 1 to about 2 weight percent, about 1.5 to about 40 weight percent, 1.5 to about 35 weight percent, 1.5 to about 30 weight percent, 1.5 to about 25 weight percent, about 1.5 to about 20 weight percent, about 1.5 to about 15 weight percent, about 1.5 to about 10 weight percent, about 1.5 to about 8 weight percent, about 1.5 to about 5 weight percent, about 1.5 to about 4 weight percent, about 1.5 to about 3 weight percent, about 1.5 to about 2 weight percent, about 2 to about 40 weight percent, 2 to about 35 weight percent, 2 to about 30 weight percent, 2 to about 25 weight percent, about 2 to about 20 weight percent, about 2 to about 15 weight percent, about 2 to about 10 weight percent, about 2 to about 8 weight percent, about 2 to about 5 weight percent, about 2 to about 4 weight percent, about 2 to about 3 weight percent, based on the total weight of the composition.

The ratio, by weight, of organic solvent to the total amount of surfactant and additives in the cleaning composition can be at least about 0.002:1, at least about 0.005:1, at least about 0.010:1, at least about 0.050:1, at least about 0.10:1 and/or not more than about 150:1, not more than about 100:1, not more than about 50:1, not more than about 25:1, not more than about 10:1, not more than about 5:1, not more than about 0.5:1, or in the range of from about 0.002:1 to about 150:1, about 0.002:1 to about 100:1, about 0.002:1 to about 50:1, about 0.002:1 to about 25:1, about 0.002:1 to about 10:1, about 0.002 to about 5:1, about 0.002:1 to about 0.5:1, about 0.005:1 to about 150:1, about 0.005:1 to about 100:1, about 0.005:1 to about 50:1, about 0.005:1 to about 25:1, about 0.005:1 to about 10:1, about 0.005:1 to about 5:1, about 0.005:1 to about 0.5:1, about 0.010:1 to about 150:1, about 0.010:1 to about 100:1, about 0.010:1 to about 50:1, about 0.010:1 to about 25:1, about 0.010:1 to about 10:1, about 0.010:1 to about 5:1, about 0.010:1 to about 0.5:1, about 0.050:1 to about 150:1, about 0.050:1 to about 100:1, about 0.050:1 to about 50:1, about 0.050:1 to about 25:1, about 0.050:1 to about 10:1, about 0.050:1 to about 5:1, about 0.050:1 to about 0.5:1, about 0.10:1 to about 150:1, about 0.10:1 to about 100:1, about 0.10:1 to about 50:1, about 0.10:1 to about 25:1, about 0.10:1 to about 10:1, about 0.10:1 to about 5:1, about 0.10 to about 0.5:1.

The cleaning composition of the present invention may comprise additional solvents selected from the group consisting of an aliphatic or acyclic hydrocarbon, a halocarbon, a polyol, a glycol ether, an ether, an ester of a glycol ether, an alcohol, an ester, a ketone, and combinations thereof. Specific examples of additional solvents include, but are not limited to, methyl acetate, ethyl acetate, methyl propionate, iso-propyl acetate, n-propyl acetate, iso-butyl acetate, n-butyl acetate, amyl acetate, methyl amyl acetate, ethyl propionate, n-propyl propionate, n-butyl propionate, methyl iso-butyrate, n-butyrate, isobutyl butyrate, isobutyl isobutyrate, 2-ethylhexyl acetate, ethylene glycol diacetate, acetone, methyl ethyl ketone, methyl n-propyl ketone, methyl isobutyl ketone, methyl iso-amyl ketone, diisobutyl ketone, cyclohexanone, methanol, ethanol, isopropanol, n-propanol, isobutanol, sec-butanol, n-butanol, t-pentyl alcohol, 2,3-dimethyl-2-butanol, cyclohexanol, 2-ethyl hexanol, benzyl alcohol, ethylene glycol, propylene glycol, hexylene glycol, 1,3-propanediol, 2-methyl-1,3-propanediol, diethyleneglycol, dipropyleneglycol, glycerol, formamide, acetamide, N-methylpyrrolidone, N,N-dimethylformamide, N,N-dimethylacetamide, sulfolane, dimethylsulfoxide, gamma-butyrolactone, propylene carbonate, ethylene glycol monopropyl ether, ethylene glycol monobutyl ether, ethylene glycol monohexyl ether, ethylene glycol 2-ethylhexyl ether, ethylene glycol phenyl ether, ethylene glycol butyl ether acetate, diethylene glycol monomethyl ether, diethylene glycol monoethyl ether, diethylene glycol monopropyl ether, diethylene glycol monobutyl ether, diethylene glycol monohexyl ether, diethylene glycol methyl ether acetate, diethylene glycol propyl ether acetate, diethylene glycol butyl ether acetate, triethylene glycol monomethyl ether, triethylene glycol monoethyl ether, triethylene glycol monopropyl ether, triethylene glycol monobutyl ether, propylene glycol monomethyl ether, propylene glycol n-propyl ether, propylene glycol n-butyl ether, propylene glycol methyl ether acetate, dipropylene glycol methyl ether, dipropylene glycol n-propyl ether, dipropylene glycol n-butyl ether, tripropylene glycol methyl ether, tripropylene glycol n-propyl ether, and tripropylene glycol n-butyl ether, ester derivatives thereof, and combinations thereof.

The cleaning composition may include at least one metal chelating agent. Examples of suitable chelating agents include, but are not limited to, triazoles, such as 1,2,4-triazole (TAZ), or triazoles substituted with substituents such as $C_1$-$C_8$ alkyl, amino, thiol, mercapto, imino, carboxy and nitro groups, such as benzotriazole (BTA), tolyltriazole, 5-phenyl-benzotriazole, 5-nitro-benzotriazole, 3-amino-5-mercapto-1,2,4-triazole, 1-amino-1,2,4-triazole, hydroxybenzotriazole, 2-(5-amino-pentyl)-benzotriazole, 1-amino-1,2,3-triazole, 1-amino-5-methyl-1,2,3-triazole, 3-amino-1,2,4-triazole, 3-mercapto-1,2,4-triazole, 3-isopropyl-1,2,4-triazole, 5-phenylthiol-benzotriazole, chloro-benzotriazoles, naphthotriazole, as well as thiazoles, tetrazoles, imidazoles, phosphates, thiols and azines such as 2-mercaptobenzoimidizole (MBI), 2-mercaptobenzothiazole, 4-methyl-2-phenylimidazole, 2-mercaptothiazoline, 5-aminotetrazole (ATA), 5-amino-1,3,4-thiadiazole-2-thiol, 2,4-diamino-6-methyl-1,3,5-triazine, thiazole, triazine, methyltetrazole, 1,3-dimethyl-2-imidazolidinone, 1,5-pentamethylenetetrazole, 1-phenyl-5-mercaptotetrazole, diaminomethyltriazine, mercaptobenzothiazole, imidazoline thione, mercaptobenzimidazole, 4-methyl-4H-1,2,4-triazole-3-thiol, 5-amino-1,3,4-thiadiazole-2-thiol, benzothiazole, tritolyl phosphate, indiazole, ethylenediaminetetraacetic acid (EDTA), 1,2-cyclohexanediamine-N,N,N',N'-tetraacetic acid (CDTA), catechol, gallic acid, thiophenol, nitrilotriacetic acid (NTA), N,N'-bis(2-hydroxyphenyl) ethylenediiminodiacetic acid (HPED), triethylenetetranitrilohexaacetic acid (TTNA), desferriferrioxamin B,N,N',N"-tris[2-(N-hydroxycarbonyl)ethyl]-1,3,5-benzenetricarboxamide (BAMTPH), ethylenediaminediorthohydroxyphenylacetic acid (EDDHA), ethylenediaminetetramethylenephosphonic acid (EDTMP), α-(hydroxyimino)phosphonic acid, propylenediaminetetraacetic acid (PDTA), hydroxypropylenediaminetetraacetic acid (HPDTA), isoserinediacetic acid (ISDA), β-alaninediacetic acid (8-ADA), hydroxyethanediphosphonic acid, diethylenetriaminetetraacetic acid, diethylenetriaminetetramethylenephosphonic acid, 1-hydroxyethane, 1,1 diphosphonic acid, methylene disphosphonic acid, hydroxymethylene diphosphonic acid, dichloromethylene disphosphonic acid, hydroxycyclohexylmethylene disphosphonic acid, 1-hydroxy-3-aminopropane 1,1 diphosphonic acid, 1-hydroxy-4-aminobutane, 1,1 diphosphonic acid, hydroxyethyleneaminodiacetic acid, hydroxyethylethylenediaminetriacetic acid, diethylenetriaminepentaacetic acid, diethanolglycine, ethanolglycine, citric acid, glycolic acid, glyoxylic acid, acetic acid, lactic acid, phosphonic acid, glucoheptonic acid or tartaric acid, polyacrylates, carbonates, phosphonates, gluconates, dithiocarbamates, and combinations thereof.

Depending on the formulation, the cleaning composition may also include one or more pH adjusting and/or buffering agents to control or maintain the pH of the composition within a certain range. Examples of suitable pH adjusting and/or buffering agents include, but are not limited to, citric acid, lactic acid, glycolic acid, 3-hydroxybutenoic acid, glyceric acid, malic acid, tartaric acid, malonic acid, succinic acid, glutaric acid, adipic acid, maleic acid, fumaric acid and phtalic acid or alkaline compounds such as sodium and potassium carbonate, bicarbonate and hydroxide. Additionally, the composition may include a pH buffering agent such as, for example, weak acids and the alkali metal or ammonium salts thereof such as boric acid, or an organic carboxylic acid such as lactic acid, maleic acid, ascorbic acid, malic acid, benzoic acid, fumaric acid, succinic acid, oxalic acid, malonic acid, mandelic acid, maleic anhydride, citric acid, phthalic acid, and other aliphatic and aromatic carboxylic acids. Suitable ammonium salts can include, for example, tetralkylammonium salts of the above listed weak acids, wherein the tetralkylammonium ion is represented by $[NR_1R_2R_3R_4]^+$, where $R_1$, $R_2$, $R_3$ and $R_4$ may be the same as or different from one another and are selected from the group consisting of $C_1$-$C_6$ straight-chained or branched alkyl (e.g., methyl, ethyl, propyl, butyl, pentyl, hexyl) or $C_6$-$C_{10}$ substituted or unsubstituted aryl groups (e.g., benzyl).

With or without a pH adjusting or buffering agent, the cleaning composition may have a pH of at least about 4, at least about 4.5, at least about 5, at least about 5.5, and/or not more than about 8, not more than about 7.5, not more than about 7, not more than about 6.5, not more than about 6. The pH of the composition can be about 4 to about 8, about 4 to about 7.5, about 4 to about 7, about 4 to about 6.5, about 4 to about 6, about 4.5 to about 8, about 4.5 to about 7.5, about 4.5 to about 7, about 4.5 to about 6.5, about 4.5 to about 6, about 5 to about 8, about 5 to about 7.5, about 5 to about 7, about 5 to about 6.5, about 5 to about 6, about 5.5 to about 8, about 5.5 to about 7.5, about 5.5 to about 7, about 5.5 to about 6.5, about 5.5 to about 6.

The cleaning composition of the present invention can also include at least one fragrance. When present, the fragrance may be incorporated into the composition in an amount of at least about 0.01 weight percent, at least about 0.05 weight percent, at least about 0.10 weight percent, at least about 0.50 weight percent, at least about 1 weight percent and/or not more than about 5 weight percent, not more than about 4 weight percent, not more than about 3 weight percent, not more than about 2 weight percent. The fragrance may be present in the cleaning composition in an amount in the range of from about 0.01 to about 5 weight percent, about 0.01 to about 4 weight percent, about 0.01 to about 3 weight percent, about 0.01 to about 2 weight percent, about 0.05 to about 5 weight percent, about 0.05 to about 4 weight percent, about 0.05 to about 3 weight percent, about 0.05 to about 2 weight percent, about 0.10 to about 5 weight percent, about 0.10 to about 4 weight percent, about 0.10 to about 3 weight percent, about 0.10 to about 2 weight percent, about 0.50 to about 5 weight percent, about 0.50 to about 4 weight percent, about 0.50 to about 3 weight percent, about 0.50 to about 2 weight percent, about 1 to about 5 weight percent, about 1 to about 4 weight percent, about 1 to about 3 weight percent, about 1 to about 2 weight percent, based on the total weight of the composition.

Examples of suitable fragrances can include, but are not limited to, synthetic oils and/or ethanolic natural plant extract. The fragrance can be present in a concentrated form, or as an aqueous solution or in combination with an organic solvent carrier, such as ethanol. Suitable aqueous (e.g. steam-distilled), alcoholic or aqueous alcoholic plant extracts can originate from leaves, fruits, blossoms, roots, rinds or stems of aloe, pineapple, artichoke, arnica, avocado, valerian, bamboo, henbane, birch, stinging nettle, echinacea, ivy, wild angelica, gentian, ferns, pine needles, silver weed, ginseng, broom, oat, rose hip, hamamelis, hay flowers, elderberry, hop, coltsfoot, currants, chamomile, carrots, chestnuts, clover, burr root, cocoanut, cornflower, lime blossom, lily of the valley, marine algae, balm, mistletoe, passion flower, ratanhia, marigold, rosemary, horse chestnut, pink hawthorn, sage, horsetail, yarrow, primrose, nettle, thyme, walnut, wine leaves, and white hawthorn. The fragrance, when present in the cleaning composition, can include one or more of these or other similar components. Alternatively, the cleaning composition of the present invention may be un-fragranced.

The cleaning composition may also include at least one preservative. When present, the preservative may be incorporated into the composition in an amount of at least about 0.001 weight percent, at least about 0.005 weight percent, at least about 0.010 weight percent and/or not more than about 2 weight percent, not more than about 1.5 weight percent, not more than about 1 weight percent. The preservative can be present in the cleaning composition in an amount in the range of from about 0.001 to about 2 weight percent, about 0.001 to about 1.5 weight percent, about 0.001 to about 1 weight percent, about 0.005 to about 2 weight percent, about 0.005 to about 1.5 weight percent, about 0.005 to about 1 weight percent, about 0.010 to about 2 weight percent, about 0.010 to about 1.5 weight percent, about 0.010 to about 1 weight percent, based on the total weight of the composition. Examples of suitable preservatives include, but are not limited to, methylchloroisothiazolinone, methyl isothiazolinone, glutaraldehyde, 1,2-benzisothiazoline-3-one, polyhexa-methylenebiguanide hydrochloride, phenoxyethanol, methylparaben, propyl P-hydroxybenzoate (propyl paraben), and sodium benzoate.

The cleaning composition can also include at least one defoaming agent. When present in the cleaning composition, the defoaming agent can be present in an amount of at least about 0.001 weight percent, at least about 0.005 weight percent, at least about 0.010 weight percent and/or not more than about 2 weight percent, not more than about 1.5 weight percent, not more than about 1 weight percent, based on the total weight of the composition. The preservative can be present in the cleaning composition in an amount in the range of from about 0.001 to about 2 weight percent, about 0.001 to about 1.5 weight percent, about 0.001 to about 1 weight percent, about 0.005 to about 2 weight percent, about 0.005 to about 1.5 weight percent, about 0.005 to about 1 weight percent, about 0.010 to about 2 weight percent, about 0.010 to about 1.5 weight percent, about 0.010 to about 1 weight percent, based on the total weight of the composition. Examples of suitable defoaming agents can include, but are not limited to, silica dispersed in polydimethyl siloxane, polydimethyl siloxane, and functionalized polydimethyl siloxanes, hydrocarbon oils and waxes, fatty esters, alcohols, soaps, and ethoxylates, polyethylene glycol esters, alkyl phosphate esters, and combinations thereof.

Additionally, the cleaning composition can include one or more metal protectants, such as, for example, sodium gluconate or sodium glucoheptonate. When present, the metal protectant can be incorporated into the composition in an amount of at least about 0.05 weight percent, at least about 0.10 weight percent, at least about 0.15 weight percent and/or not more than about 5 weight percent, not more than about 4 weight percent, not more than about 3 weight percent. The cleaning composition can include a metal protectant present in an amount in the range of about 0.05 to about 5 weight percent, about 0.05 to about 4 weight percent, about 0.05 to about 3 weight percent, about 0.10 to about 5 weight percent, about 0.10 to about 4 weight percent, about 0.10 to about 3 weight percent, about 0.15 to about 5 weight percent, about 0.15 to about 4 weight percent, about 0.15 to about 3 weight percent, based on the total weight of the composition.

The cleaning composition of the present invention can be dyed or un-dyed. If dyed, the composition may include at least one dye in an amount of at least in an amount of at least about 0.05 weight percent, at least about 0.10 weight percent, at least about 0.50 weight percent and/or not more than about 5 weight percent, not more than about 4 weight percent, not more than about 3 weight percent, not more than about 2 weight percent. The cleaning composition can include a metal protectant present in an amount in the range of about 0.05 to about 5 weight percent, about 0.05 to about 4 weight percent, about 0.05 to about 3 weight percent, about 0.05 to 2 weight percent, about 0.10 to about 5 weight percent, about 0.10 to about 4 weight percent, about 0.10 to about 3 weight percent, about 0.10 to about 2 weight percent, about 0.50 to about 5 weight percent, about 0.50 to about 4 weight percent, about 0.50 to about 3 weight percent, about 0.50 to about 2 weight percent, based on the total weight of the composition.

The dye can be an anionic dye. Examples of suitable anionic dyes can include, but are not limited to, Acid Black 1, Acid Blue 1, Acid Blue 3, Food Blue 5, Acid Blue 7, Acid Blue 9, Acid Blue 74, Acid Orange 3, Acid Orange 6, Acid Orange 7, Acid Orange 10, Acid Red 1, Acid Red 14, Acid Red 18, Acid Red 27, Acid Red 50, Acid Red 52, Acid Red 73, Acid Red 87, Acid Red 88, Acid Red 92, Acid Red 155, Acid Red 180, Acid Violet 9, Acid Violet 43, Acid Violet 49, Acid Yellow 1, Acid Yellow 23, Food Yellow No. 8, D&C Brown No. 1, D&C Green No. 5, D&C Green No. 8, D&C Orange No. 4, D&C Orange No. 10, D&C Red No. 21, D&C Red No. 27, D&C Red No. 33, D&C Violet 2, D&C Yellow No. 7, D&C Yellow No. 8, D&C Yellow No. 10, FD&C Red 2, FD&C Red 40, FD&C Red No. 4, FD&C Yellow No. 6, FD&C Blue 1, Food Black 1, Food Black 2, Disperse Black 9 and Disperse Violet 1 and sodium or potassium salts thereof. Neutral dyes may also be used in the present invention, representative examples being HC Blue No. 2, HC Blue No. 4, HC Blue No. 11, HC Brown No. 1, HC Brown No. 2, HC Green No. 1, HC Orange No. 1, HC Orange No. 2, HC Orange No. 5, HC Red BN, HC Red No. 1, HC Red No. 9, HC Red No. 10, HC Violet BS, HC Violet No. 1, HC Violet No. 2, HC Yellow No. 2, HC Yellow No. 9, HC Yellow No. 10, HC Yellow No. 11, and HC Yellow No. 15. The dye may also be nonionic.

Whether dyed or un-dyed, the cleaning composition may be visually clear, transparent, translucent, or opaque, depending, at least in part, on its particular formulation and/or its ultimate form. For example, the cleaning composition can comprise a visually clear, homogenous solution or a visually clear or transparent microemulsion. Alternatively, the cleaning compositions described herein may comprise an emulsion and may be translucent, cloudy, or even opaque.

The cleaning composition of the present invention can be made according to any suitable method. For example, the cleaning composition of the present composition can be formed by combining the organic solvent, water, and optional surfactant to form a cleaning mixture. In one case, the organic solvent can be mixed with the surfactant, when present, to form a homogenous mixture and the homogenous mixture can then be added to the water under strong agitation. In another example, the combining can include mixing the water and a surfactant to form an aqueous homogenous mixture and before adding the organic solvent to form the cleaning mixture. Alternatively, the water and the organic solvent can be combined to form a mixture to which a surfactant, when employed, may be added. If needed, the combining of components to form the cleaning composition may be at least partially carried out using mechanical agitation, depending on the formulation and final form desired for the cleaning composition.

Cleaning compositions as described above can be in the form of a solution, an emulsion, or a micro-emulsion. When the cleaning composition is a solution, it may be a homogenous solution and may be clear, transparent, translucent, or opaque. When the cleaning composition is an emulsion or micro-emulsion, it may be an oil-in-water emulsion, with droplets of the organic solvent being dispersed in the continuous water phase, or a water-in-oil emulsion with droplets of water dispersed in a continuous solvent phase, although the former is preferred. Micro-emulsions can be clear, transparent, translucent, or opaque, while emulsions can be translucent or opaque. When the cleaning composition is an emulsion or microemulsion, it may include at least one surfactant and/or at least one co-solvent, including those described in detail previously, along with the organic solvent, with the organic solvent being present in amounts of at least 4 weight percent, based on the total weight of the composition. When the cleaning composition is a solution, however, it may or may not include a surfactant.

If the cleaning composition is formulated as an emulsion, the composition can be a stable emulsion at storage and use temperatures of at least about 0° F., at least about 15° F., at least about 20° F., at least about 35° F. and/or not more than 80° F., not more than about 75° F., not more than about 70° F., not more than about 65° F. The cleaning compositions of the present invention can be solutions, emulsions, or micro-emulsions stable at storage and use temperatures in the range of from about 0 to about 80° F., about 0 to about 75° F., about 0 to about 70° F., about 0 to about 65° F., about 15 to about 80° F., about 15 to about 75° F., about 15 to about 70° F., about 15 to about 65° F., about 20 to about 80° F., about 20 to about 75° F., about 20 to about 70° F., about 20 to about 65° F., about 35 to about 80° F., about 35 to about 75° F., about 35 to about 70° F., about 35 to about 65° F.

The cleaning mixture resulting from the above-described combining step may be a "ready-to-use" (RTU) formulation or a concentrate. In some cases, RTU formulations can be solutions or micro-emulsions, while concentrates can be micro-emulsions or emulsions. Whether the cleaning composition is a concentrate or an RTU formulation, it may include an organic solvent, water, a surfactant, and an additive of the types and/or in the amount listed above.

In one exemplary RTU formulation, the cleaning composition can include an organic solvent in an amount of at least about 0.1 weight percent, at least about 0.5 weight percent, at least about 1 weight percent, and/or not more than about 10 weight percent, not more than about 5 weight percent, not more than about 3 weight percent, based on the total weight of the composition. In one example, an RTU formulation can include an organic solvent in an amount in the range of from about 0.1 to about 10 weight percent, about 0.1 to about 5 weight percent, about 0.1 to about 3 weight percent, about 0.5 to about 10 weight percent, about 0.5 to about 5 weight percent, about 0.5 to about 3 weight percent, about 1 to about 10 weight percent, about 1 to about 5 weight percent, about 1 to 3 weight percent, based on the total weight of the composition.

In the same or a different exemplary RTU formulation, water may be present in an amount of at least about 75 weight percent, at least about 80 weight percent, at least about 85 weight percent, at least about 90 weight percent and/or not more than about 99.9 weight percent, not more than about 99 weight percent, not more than about 98 weight percent, not more than about 97 weight percent, not more than about 95 weight percent, or in an amount in the range of from about 75 to about 99.9 weight percent, about 75 to about 99 weight percent, about 75 to about 98 weight percent, about 75 to about 97 weight percent, about 75 to about 95 weight percent, about 80 to about 99.9 weight percent, about 80 to about 99 weight percent, about 80 to about 98 weight percent, about 80 to about 97 weight percent, about 80 to about 95 weight percent, from about 85 to about 99.9 weight percent, about 85 to about 99 weight percent, about 85 to about 98 weight percent, about 85 to about 97 weight percent, about 85 to about 95 weight percent, from about 90 to about 99.9 weight percent, about 90 to about 99 weight percent, about 90 to about 98 weight percent, about 90 to about 97 weight percent, about 90 to about 95 weight percent, based on the total weight of the composition.

In the same or a different exemplary RTU formulation, the ratio of organic solvent to water in the cleaning composition can be at least about 0.002:1, at least about 0.003:1, at least about 0.005:1 and/or not more than about 0.040:1, not more than about 0.035:1, not more than about 0.030:1 or in the range of from about 0.002:1 to about 0.040:1, about 0.002:1 to about 0.035:1, about 0.002:1 to about 0.030:1, about 0.003:1 to about 0.040:1, about 0.003:1 to about 0.035:1, about 0.003:1 to about 0.030:1, about 0.005:1 to about 0.040:1, about 0.005:1 to about 0.035:1, about 0.005:1 to about 0.030:1, based on the total weight of said composition.

In the same or a different RTU formulation, the total amount of surfactant and additives can be present in the cleaning composition in an amount of at least about 0.1 weight percent, at least about 0.5 weight percent, at least about 1 weight percent, at least about 2 weight percent and/or not more than about 20 weight percent, not more than about 10 weight percent, not more than about 8 weight percent, not more than about 6 weight percent, not more than about 5 weight percent or in an amount in the range of from about 0.1 to about 20 weight percent, about 0.1 to 10 weight percent, about 0.1 to 8 weight percent, about 0.1 to 6 weight percent, 0.1 to 5 weight percent, about 0.5 to about 20 weight percent, about 0.5 to 10 weight percent, about 0.5 to 8 weight percent, about 0.5 to 6 weight percent, 0.5 to 5 weight percent, about 1 to about 20 weight percent, about 1 to 10 weight percent, about 1 to 8 weight percent, about 1 to 6 weight percent, 1 to 5 weight percent, about 2 to about 20 weight percent, about 2 to 10 weight percent, about 2 to 8 weight percent, about 2 to 6 weight percent, 2 to 5 weight percent, based on the total weight of the composition.

When the cleaning composition (or cleaning mixture) is a concentrate, it can optionally be diluted with one or more diluents, such as, for example, water prior to use as a cleaning composition. Alternatively, the concentrate itself may be used as a cleaning composition.

In one exemplary concentrate formulation, the cleaning composition can include an organic solvent in an amount of at least about 0.5 weight percent, at least about 1 weight percent, at least about 5 weight percent and/or not more than about 15 weight percent, not more than about 10 weight percent, based on the total weight of the composition. In one example, an RTU formulation can include an organic solvent in an amount in the range of from about 0.5 to about 15 weight percent, about 0.5 to about 10 weight percent, about 1 to about 15 weight percent, about 1 to about 10 weight percent, about 5 to about 15 weight percent, about 5 to about 10 weight percent, based on the total weight of the composition.

In the same or a different exemplary concentrate formulation, water may be present in an amount of at least about 30 weight percent, at least about 40 weight percent, at least about 50 weight percent and/or not more than about 90 weight percent, not more than about 80 weight percent, not more than about 75 weight percent, not more than about 65 weight percent, or in an amount in the range of from about 30 to about 90 weight percent, about 30 to about 80 weight percent, about 30 to about 75 weight percent, about 30 to about 65 weight percent, about 40 to about 90 weight percent, about 40 to about 80 weight percent, about 40 to about 75 weight percent, about 40 to about 65 weight percent, about 50 to about 90 weight percent, about 50 to about 80 weight percent, about 50 to about 75 weight percent, about 50 to about 65 weight percent, based on the total weight of the composition.

In the same or a different exemplary concentrate formulation, the ratio of organic solvent to water in the cleaning composition can be at least about 0.01:1, at least about 0.03:1, at least about 0.05:1 and/or not more than about 0.50:1, not more than about 0.25:1, not more than about 0.20:1 or in the range of from about 0.01:1 to about 0.50:1, about 0.01:1 to about 0.25:1, about 0.01:1 to about 0.20:1, about 0.03:1 to about 0.50:1, about 0.03:1 to about 0.25:1, about 0.03:1 to about 0.20:1, about 0.05:1 to about 0.50:1, about 0.05:1 to about 0.25:1, about 0.05:1 to about 0.20:1, based on the total weight of said composition.

In the same or a different exemplary concentrate formulation, the total amount of surfactant and additives present in the cleaning composition can be at least about 2 weight percent, at least about 5 weight percent, at least about 10 weight percent, at least about 20 weight percent, at least about 25 weight percent, at least about 30 weight percent, and/or not more than about 90 weight percent, not more than about 85 weight percent, not more than about 80 weight percent, not more than about 75 weight percent, not more than about 70 weight percent, not more than about 65 weight percent, not more than about 60 weight percent, based on the total weight of the composition.

The total amount of surfactant and other additives can be in the range of from about 2 to about 90 weight percent, about 2 to about 85 weight percent, about 2 to about 80 weight percent, about 2 to about 75 weight percent, about 2 to about 70 weight percent, about 2 to about 65 weight percent, about 2 to about 60 weight percent, about 5 to about 90 weight percent, about 5 to about 85 weight percent, about 5 to about 80 weight percent, about 5 to about 75 weight percent, about 5 to about 70 weight percent, about 5 to about 65 weight percent, about 5 to about 60 weight percent, about 10 to about 90 weight percent, about 10 to about 85 weight percent, about 10 to about 80 weight percent, about 10 to about 75 weight percent, about 10 to about 70 weight percent, about 10 to about 65 weight percent, about 10 to about 60 weight percent, about 20 to about 90 weight percent, about 20 to about 85 weight percent, about 20 to about 80 weight percent, about 20 to about 75 weight percent, about 20 to about 70 weight percent, about 20 to about 65 weight percent, about 20 to about 60 weight percent, about 25 to about 90 weight percent, about 25 to about 85 weight percent, about 25 to about 80 weight percent, about 25 to about 75 weight percent, about 25 to about 70 weight percent, about 25 to about 65 weight percent, about 25 to about 60 weight percent, about 30 to about 90 weight percent, about 30 to about 85 weight percent, about 30 to about 80 weight percent, about 30 to about 75 weight percent, about 30 to about 70 weight percent, about 30 to about 65 weight percent, about 30 to about 60 weight percent, based on the total weight of the concentrate.

When formulated as a concentrate, the cleaning composition of the present invention may be diluted, using at least one diluent such as, for example water or a liquid comprising water, to form an RTU formulation prior to use. The dilution ratio, by weight, of concentrate to water (or other diluent) can be at least about 1:80, at least about 1:50, at least about 1:20, or at least about 1:10 and/or not more than 10:1, not more than about 8:1, not more than about 5:1, not more than about 3:1, not more than about 2:1, not more than about 1:1. The dilution ratio, by weight, of concentrate to water can be in the range of from about 1:80 to 10:1, about 1:80 to about 8:1, about 1:80 to about 5:1, about 1:80 to about 3:1, about 1:80 to about 2:1, about 1:80 to about 1:1, 1:50 to 10:1, about 1:50 to about 8:1, about 1:50 to about 5:1, about 1:50 to about 3:1, about 1:50 to about 2:1, about 1:50 to about 1:1, about 1:20 to 10:1, about 1:20 to about 8:1, about 1:20 to about 5:1, about 1:20 to about 3:1, about 1:20 to about 2:1, about 1:20 to about 1:1, about 1:10 to 10:1, about 1:10 to about 8:1, about 1:10 to about 5:1, about 1:10 to about 3:1, about 1:10 to about 2:1, about 1:10 to about 1:1.

In addition to being formulated as an RTU or dilatable concentrate as described above, the cleaning compositions of the present invention may also be formulated as or incorporated into other forms, including, but not limited to, gels, pastes, slurries, foams, wipes, sprays, and aerosols and may be applied to the substrate using any suitable method, such as, for example, wiping, spraying, foaming, soaking, scrubbing, and combinations thereof. When using the cleaning composition of the present invention, at least a portion of the contacting can be carried out by applying at least a portion of the cleaning composition with a spray nozzle, a pressurized spray nozzle, a sponge, a cloth, a wipe, a bucket, a pad, a scrubber, a brush, a hose, or combinations thereof.

The present invention also concerns a method of using a cleaning composition that comprises contacting a substrate with a cleaning composition comprising water and at least one organic solvent, as described in detail previously. The cleaning composition may also include a surfactant and one or more additional components of the types and in the amounts as described in detail previously.

The cleaning compositions of the present invention can be domestic or household cleaners, suitable for cleaning a variety of household substrates, or may be specifically formulated for commercial, industrial, and/or institutional use. In some cases, the composition may be usable in all three settings with no loss of performance. The uses of the cleaning compositions described herein are diverse and one or more of the compositions may comprise or be used in a descaling composition, a bathroom cleaner, a toiled cleaner, a glass cleaner, a floor cleaner, a biocidal cleaner, an automotive cleaner, a wood cleaner, a plastic cleaner, a paint stripper, a degreasing composition, a desoiling composition, and/or an all-purpose general cleaner.

The type of substrate being contacted can be located in nearly any type of environment. The substrate may, for example, present a hard surface that can be a domestic surface located in a kitchen, bathroom, laundry room, garage, automobile, basement, outdoor area, and the like. The substrate being cleaned may comprise an industrial and/or institutional substrate associated with, for example, an industrial or institutional kitchen, bathroom, laundering area, or laboratory, and/or the substrate may be a medical substrate, a clinical substrate, or may be a substrate associated with transportation equipment including, for example, automobiles, airplanes, trains, subways, boats, and the like. Examples of specific types of substrates can include, but are not limited to, floors, walls, tiles, windows, sinks, showers, bathtubs, shower curtains, wash basins, drains, dishes, fixtures, fittings, counter tops, cabinets, stove tops, appliance surfaces, such as internal and external surfaces of refrigerators, microwave ovens, convection ovens, freezers, dishwashers, washing machines, and dryers. The substrate may also be associated with furniture or a portion of a transportation device, such as an interior, exterior, or engine surface of a car, boat, plane, or train.

As part of the method of cleaning a substrate described herein, at least a portion of the cleaning composition used to contact the substrate may subsequently be removed. In some cases, the cleaning composition, once applied, is allowed to remain on the substrate for some period of time before being removed. This "soak period," measured from the end of the application of the composition to the substrate to the beginning of the removal of at least a portion of the cleaning composition from the substrate, can be of any suitable duration. The length of the soak time can be, for example, at least about 10 seconds, at least about 30 seconds, at least about 1 minute, at least about 5 minutes, and/or not more than about 1 day, not more than about 8 hours, not more than about 4 hours, not more than about 2 hours, not more than about 1 hour, not more than about 30 minutes, not more than about 5 minutes, not more than about 1 minute, not more than about 30 seconds.

The "soak period" can have a length in the range of from about 10 seconds to about 1 day, about 10 seconds to about 8 hours, about 10 seconds to about 4 hours, about 10 seconds to about 2 hours, about 10 seconds to about 1 hour, about 10 seconds to about 30 minutes, about 10 seconds to about 5 minutes, about 10 seconds to about 1 minute, about 10 seconds to about 30 seconds, about 30 seconds to about 1 day, about 30 seconds to about 8 hours, about 30 seconds to about 4 hours, about 30 seconds to about 2 hours, about 30 seconds to about 1 hour, about 30 seconds to about 30 minutes, about 30 seconds to about 5 minutes, about 30 seconds to about 1 minute, about 1 minute to about 1 day, about 1 minute to about 8 hours, about 1 minute to about 4 hours, about 1 minute to about 2 hours, about 1 minute to about 1 hour, about 1 minute to about 30 minutes, about 1 minute to about 5 minutes, about 5 minutes to about 1 day, about 5 minutes to about 8 hours, about 5 minutes to about 4 hours, about 5 minutes to about 2 hours, about 5 minutes to about 1 hour, about 5 minutes to about 30 minutes.

In some cases, there may be no or substantially no soak time. For example, the soak period can be not more than about 10 seconds, not more than about 8 seconds, not more than about 5 seconds, not more than about 2 seconds, not more than about 1 second. Alternatively, the cleaning composition can be applied and removed simultaneously or nearly simultaneously from at least a portion of the substrate.

During removal, at least a portion of the cleaning composition may be rinsed from the substrate using a rinse fluid, applied in the same or a different way than the cleaning composition. The rinse fluid may be an aqueous rinse fluid comprising water or may be water. The rinse fluid may also include one or more additional additives and may, in some cases, be mixed with a cleaning composition of the same or different formulation than the cleaning composition being rinsed from the substrate. After being at least partially rinsed, the substrate may again be re-contacted with a cleaning composition having the same or a different composition, which can then be rinsed again in a similar manner. The steps of rinsing and repeating contacting depends on the soil type and level of desired clean and can be repeated at least 2, 3, or 4 times.

The above-described method of cleaning a substrate may be sufficient to remove at least about 60, at least about 70, at least about 75, at least about 80, at least about 85, at least about 90, at least about 95, at least about 97, at least about 99, or substantially all of the soil from the substrate. When a substrate is soiled by two different types of soil, the cleaning composition and method described above may be capable of removing at least about 40, at least about 50, at least about 60, at least about 70, at least about 80, at least about 90 percent of each type of soil. Even when the soils are of different types, such as, for example, hydrophilic and hydrophobic soils, the cleaning compositions of the present invention may be capable of such removal.

The cleaning compositions of the present invention can be domestic or household cleaners, suitable for cleaning a variety of household substrates, or may be specifically formulated for commercial, industrial, and/or institutional use. In some cases, the composition may be usable in all three settings with no loss of performance. The uses of the cleaning compositions described herein are diverse and one or more of the compositions may comprise or be used in a descaling composition, a bathroom cleaner, a toilet cleaner, a glass cleaner, a floor cleaner, a biocidal cleaner, an automotive cleaner, a wood cleaner, a plastic cleaner, a paint stripper, a degreasing composition, a desoiling composition, and/or an all-purpose general cleaner.

The following examples are intended to be illustrative of the present invention in order to teach one of ordinary skill in the art to make and use the invention and are not intended to limit the scope of the invention in any way.

EXAMPLES

The following Examples describe the preparation of several cleaning formulations, as well as the preparation of several types of soils and the use of those soils to prepare various soiled panels on which the cleaning formulations were tested. As described below, the tests performed included both qualitative and quantitative evaluations of several comparative and inventive compositions.

Example 1

Formulation of Cleaning Compositions

Several cleaning formulations were prepared using the following procedure. First, a base stock solution was prepared by combining water, a nonionic ethoxylated alcohol surfactant (TOMADOL® 901 commercially available from Air Products and Chemicals Incorporated, Allentown, Pa.), a 31.8 w/w percent solution of cocoyl propyl betaine in water, an EDTA complexing agent, and sodium carbonate. The amounts of each of these ingredients in the base stock solution are summarized in Table 1, below.

TABLE 1

Cleaning Formulation Base Stock Solution

| Ingredient | Amount, Parts by Weight |
| --- | --- |
| Water | 94.50 |
| Surfactant | 0.50 |
| Betaine | 0.25 |
| EDTA | 2.00 |
| Sodium carbonate | 0.50 |
| Total | 97.75 |

Next, 2.25 parts by weight, based on the total cleaning composition, of several inventive and comparative solvents were added to several aliquots of the base stock solution summarized in Table 1 above in order to formulate Comparative Cleaning Compositions A-G and Inventive Cleaning Compositions 1-4. The solvents used to formulate these compositions, along with a few select physical properties of each solvent, are summarized in Table 2, below.

TABLE 2

Summary of Solvents and Select Physical Properties thereof used to Formulate Comparative Cleaning Compositions A-G and Inventive Cleaning Compositions 1-4

| Cleaning Composition | Solvent | Solvent Vapor Pressure at 20° C., torr | Solvent Boiling Point, ° C. |
| --- | --- | --- | --- |
| Comparative A | Diethylene Glycol Monoethyl Ether | 0.12 | 198-204 |
| Comparative B | Diethylene Glycol Monobutyl Ether | 0.02 | 227-235 |
| Comparative C | Dipropylene Glycol monobutyl ether | 0.04 | 230 |
| Comparative D | Benzyl Alcohol | 0.076 | 205 |
| Comparative E | Dibasic Ester | 0.20 | 196-225 |
| Comparative F | d-limonene | 1.5 | 176 |
| Comparative G | Ethylene glycol monobutyl ether | 0.60 | 169-172 |
| Inventive 1 | n-butyl 3-hydroxybutyrate | 0.06 | 217 |
| Inventive 2 | i-butyl 3-hydroxybutyrate | 0.08 | 210 |
| Inventive 3 | 2-butyl 3-hydroxybutyrate | 0.098 | 206 |
| Inventive 4 | i-propyl 3-hydroxybutyrate | 0.17 | 169 |

Example 2

Formulation of Soiled Panels

Several soiled panels were created to test the cleaning efficiency of the compositions formulated in Example 1 against various types of dirt on different types of substrates.

Soap Scum on Painted Wallboard

A soap scum soil was produced according to the following procedure. First, a hard water sample was prepared by dissolving 10 grams of calcium acetate and 3 grams of magnesium nitrate in 1 liter of deionized water. Next, a soap solution was prepared by dissolving 100 grams of IVORY brand soap (commercially available from Proctor & Gamble Company, Cincinnati, Ohio) in 1 liter of deionized water. Next, the several ingredients, the types and amounts of which are summarized in Table 3 below, were mixed thoroughly and refrigerated to form a synthetic sebum composition.

TABLE 3

Ingredients for Preparation of Synthetic Sebum

| Ingredient | Amount, grams |
| --- | --- |
| Palmitic Acid | 10 |
| Stearic Acid | 5 |
| Coconut oil | 15 |
| Cetyl Esters Wax[2] | 10 |
| Olive oil | 20 |
| Squalene | 5 |
| Cholesterol | 10 |
| Corn oil | 15 |
| Linoleic Acid | 10 |
| Total | 100 |

The soap scum was then prepared by mixing 500 mL of the hard water sample and 50 mL of the soap solution for 15 minutes and then filtering the mixture through #41 filter paper using a Buchner funnel. The residue remaining on the filter was mixed with 2 grams of graphite power in 200 mL of isopropyl alcohol for 10 minutes. Thereafter, 4 grams of the synthetic sebum was added and the mixture was allowed to mix for another 10 minutes.

The resulting soap scum was then applied to several dry wall board samples that had been previously painted with flat white paint according to ASTM D4488. Once applied, the soap scum was allowed to dry on the wall board before testing commenced.

Baked Greasy Soil on Aluminum

A greasy soil was prepared according to the A2 soil procedure outlined in ASTM 4488 by combining 33 grams each of CRISCO-brand vegetable shortening, lard, and vegetable oil, along with 1 gram of graphite powder over a steam bath. The ingredients were blended until smooth and then refrigerated. The greasy soil was then applied to several aluminum Q-panels and baked in an oven at 100° C. for 4 hours, until the grease formed a tough layer unable to be removed by mechanical cleaning.

Tar Soil on Aluminum

A tar soil blend was prepared according to the following procedure. A mixture of Tectyl 506, a viscous oil (commercially available from Petroleum Service Company in Wilkes-Barr, Pa.), and Tectyl 121B, a tar-like petroleum material also available from Petroleum Service Corporation, was formulated in a 10:90 weight ratio. The components were heated during mixing to form a homogenous blend. Once blended, a layer of tar soil having a thickness of approximately 5 mils was applied to several aluminum Q-panels and the panels were allowed to air-dry for a period of 4 hours.

Tar Soil on Vinyl

A standardized tar soil blend was prepared according to the above-described procedure. Once prepared, a 5-mil layer of tar soil was applied to several commercially available vinyl floor tiles and allowed to air dry for a period of 4 hours.

Example 3

Qualitative Scrub Testing of Comparative Cleaning Compositions A-G and Inventive Cleaning Compositions 1-4

The effectiveness of Comparative Cleaning Compositions A-G and Inventive Cleaning Compositions 1-4 were tested on several of the soiled panels prepared in Example 2. During testing, the cleaning compositions were applied with a scrubbing machine constructed by modifying an MEK Double Rub Test machine (commercially available from DJH, Inc. in Oakville, Ontario, Canada or Gardco in Pompano Beach, Fla.) to include a sponge holder instead of a hammer. The sponge holder was formed of a 4-inch aluminum cylinder having a ¾-inch internal diameter, with a holder ring inserted ½ inch from the bottom of the cylinder to hold the sponge in place during cleaning at a fixed distance of ½ inch above the panel being cleaned.

To begin, a clean 1½ inch thick SCOTCH BRITE sponge, commercially available from 3M Company, St. Paul, Minn., was cut into several cylindrical plugs having a height of 1½ inches and a diameter of ¾ inches. A first sponge plug was inserted into the machine holder and the cleaning solution to be tested was poured onto the sponge from the top until the sponge was visually saturated, but not flooded. Scrubbing commenced using the scrubbing machine, using a method similar to the Gardner scrub test with minimal friction between the sponge and surface being cleaned. The scrubbing path was 0.8 inches wide and 2 inches long, with one stroke (two passes) taking 0.4 seconds.

Each of Comparative Cleaning Compositions A-G and Inventive Cleaning Compositions 1-4 were tested on several soiled panels prepared as described in Example 2. Each of the panels were scrubbed until the earlier of 1000 strokes or until the panel was clean. If the scrubbing stopped due to a cleaned panel, the number of strokes required to achieve that result was recorded. Additionally, one the scrubbing was stopped, the operator observed each panel and evaluated its cleanliness using a qualitative rating scale with "10" indicating a completely clean panel and "2" indicating a panel with very little cleaning. When evaluating the cleaning compositions with wall board panels, the effectiveness of the composition was not apparent when the board was wet. Therefore, a set number of strokes (e.g., 25, 50, 100, etc.) was carried out and the board was allowed to dry before evaluation.

Each of Comparative Cleaning Compositions A-G and Inventive Cleaning Compositions 1-4 were tested on each of the soiled substrates prepared in Example 2. The results of the qualitative analysis are provided in Table 4, below.

TABLE 4

Qualitative Evaluations of Performance of Comparative Cleaning Compositions A-G and Inventive Cleaning Compositions 1-4 on Various Soiled Panels

| Type of Composition | Cleaning Composition | Grease on Aluminum | | Tar on Aluminum | | Tar on Vinyl | | Soap Scum on Wall board | |
| --- | --- | --- | --- | --- | --- | --- | --- | --- | --- |
| | | # Strokes | Visual Grade | # Strokes | Visual Grade | # Strokes | Visual Grade | # Strokes | Visual Grade |
| Comparative | A | 1000 | 2 | 1000 | 2 | 1000 | 5 | 200 | 2 |
| Comparative | B | 1000 | 7 | 1000 | 3 | 1000 | 9 | 200 | 6 |
| Comparative | C | 1000 | 3 | 700 | 8 | 1000 | 8 | 125 | 9 |
| Comparative | D | 700 | 4 | 800 | 8 | 1000 | 2 | ne | ne |
| Comparative | E | 700 | 6 | 1000 | 8 | 1000 | 9 | 150 | 8 |
| Comparative | F | 600 | 7 | 1000 | 9 | — | — | — | — |
| Comparative | G | 800 | 5 | 1000 | 4 | — | — | 200 | 4 |
| Inventive | 1 | 640 | 10 | 500 | 10 | 1000 | 10 | 100 | 10 |

TABLE 4-continued

Qualitative Evaluations of Performance of Comparative Cleaning Compositions
A-G and Inventive Cleaning Compositions 1-4 on Various Soiled Panels

| Type of Composition | Cleaning Composition | Grease on Aluminum | | Tar on Aluminum | | Tar on Vinyl | | Soap Scum on Wall board | |
|---|---|---|---|---|---|---|---|---|---|
| | | # Strokes | Visual Grade | # Strokes | Visual Grade | # Strokes | Visual Grade | # Strokes | Visual Grade |
| Inventive | 2 | 800 | 8 | 700 | 8 | 1000 | 8 | 100 | 10 |
| Inventive | 3 | 1000 | 8 | — | — | — | — | 100 | 8 |
| Inventive | 4 | 1000 | 5 | 1000 | 6 | 1000 | 6 | 200 | 4 |

Notes:
"ne" means not evaluated.

As shown in Table 4 above, for a given type of soil and panel, Inventive Compositions 1-4 tended to remove more soil, as indicated by higher scores, with fewer strokes than Comparative Cleaning Compositions A-G. In addition, as shown by the comparison of the performance of Inventive Compositions 1-4 for all types of soiled surfaces, the effectiveness of cleaning compositions of the present invention is not limited to a particular type of soil or substrate. Instead, Inventive Cleaning Compositions 1-4 have the ability to remove both hydrophobic (e.g., tar) and hydrophilic (e.g., soap scum) soils from several different types of substrates.

Example 4

Quantitative Scrub Testing of Various Comparative and Inventive Cleaning Compositions Additional scrub tests were carried out to quantify the ability of several cleaning compositions to remove different soils from a variety of substrates. During testing, several comparative and inventive cleaning compositions were subjected to scrub tests as described above in Example 3 in order to determine the number of strokes required to remove 90 percent of the soil from each panel, as measured by visual observation. If the panel required more than a specified maximum number of strokes for a given type of panel—i.e., more than 1000 strokes for an aluminum panel and more than 500 strokes for painted wall board—the test was stopped and the maximum number of strokes was recorded.

The above-described procedure was carried out using Comparative Compositions B-H and Inventive Composition 1 to remove baked greasy soil from an aluminum panel (i.e., baked grease scrub test) and to remove tar from another aluminum panel (i.e., the tar-aluminum scrub test). Additionally, the procedure was carried out using Comparative Compositions B-D and H and Inventive composition 1 to remove soap scum from painted wall board (i.e., the soap scum scrub test). Table 5, below, summarize the results, in number of strokes required to remove at least 90 percent of the soil per visual inspection, for each of the compositions and substrates listed above.

TABLE 5

Number of Strokes Required to Remove 90 percent of Soil from a Panel

| | | Soil/Substrate | | |
|---|---|---|---|---|
| Type of Composition | Cleaning Composition | Grease on Aluminum # Strokes | Tar on Aluminum # Strokes | Soap Scum on Wall Board # Strokes |
| Comparative | A | >1000 | >1000 | >500 |
| Comparative | B | >1000 | >1000 | 300 |
| Comparative | C | >1000 | 700 | 125 |
| Comparative | D | >1000 | 900 | — |
| Comparative | E | >1000 | 900 | — |
| Comparative | F | >1000 | >1000 | — |
| Comparative | G | >1000 | >1000 | >500 |
| Inventive | 1 | 640 | 500 | 100 |

In addition, FIGS. 1, 2, and 3a-3c show the appearance of each of the panels resulting from these tests, with FIG. 1 illustrating the results for each of the above compositions for removing grease from aluminum, FIG. 2 showing results for each of the above compositions for removing tar from aluminum, and FIGS. 3a-c providing results for each of the above compositions for removing soap scum from painted wall board, with the number of strokes for each trial indicated below the specific run in FIGS. 3a-3c.

Figure 4:
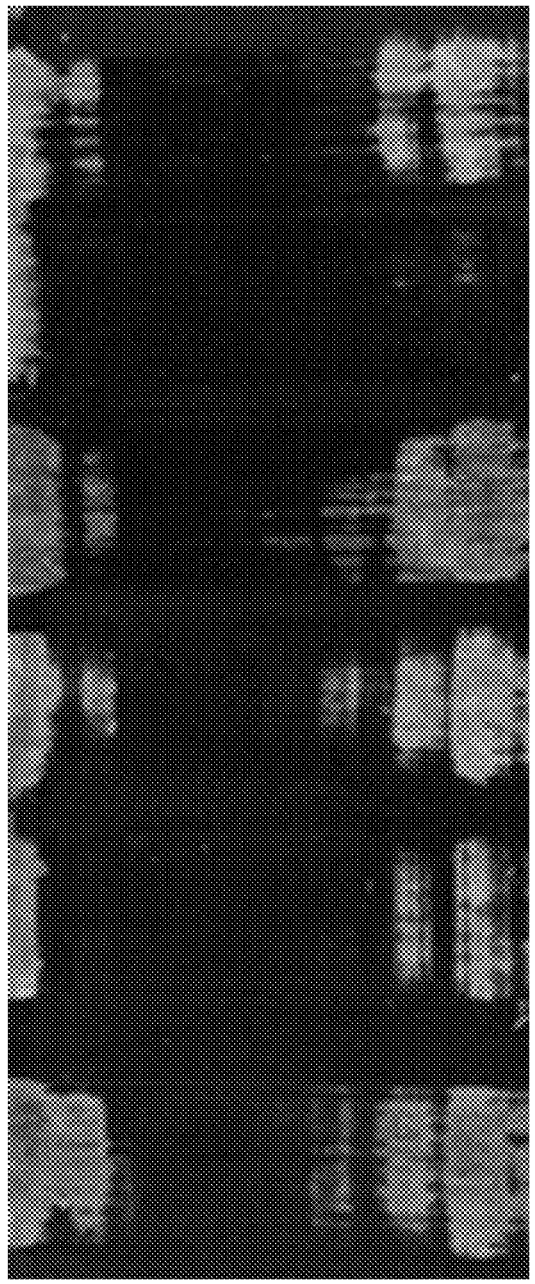
FIG. 4 depicts the results of a tar-vinyl scrub test performed using several comparative and inventive cleaning compositions to remove tar from a vinyl panel using the method described in Example 4.

Additionally, the ability of several compositions to remove tar from a vinyl panel within 1000 strokes was evaluated in a similar manner (i.e., the tar-vinyl scrub test). The panels were prepared according to the procedure described in Example 2, but, due to the difficulty of removing tar from unwaxed vinyl, each of the soiled panel was subjected to 1000 strokes using the apparatus and method described in Example 3. After 1000 strokes, the test was stopped and the results were evaluated qualitatively in a similar manner as described in Example 3, with the cleaning ability of the composition being rated visually on a scale of 1 to 10, with a "1" indicating a low level or no cleaning and a "10" indicating nearly or completely clean. The ratings assigned to each composition are summarized in Table 6, below, with the results of the test being shown in FIG. 4.

TABLE 6

Evaluation of Ability of Comparative and Inventive Cleaning Compositions to Remove Tar from Vinyl at 1,000 Strokes

| Type of Composition | Cleaning Composition | Rating |
|---|---|---|
| Comparative | A | 3 |
| Comparative | B | 5 |
| Comparative | C | 2 |
| Comparative | D | 6 |
| Inventive | 1 | 7 |
| Inventive | 4 | 4 |

Example 5

Interaction of Various Cleaning Solvents with Vinyl Flooring

Several tests were also conducted to determine the interaction of several cleaning solvents used to formulate the cleaning compositions in Example 1 with the protective wax layer found on many types of vinyl flooring. Vinyl flooring is typically waxed and buffed to a high gloss and effectively removing soil from such flooring, especially soils like tar, is challenging because the dirt must be removed without harming the wax layer. To test the effect of several of the comparative and inventive solvents, in neat form, on the wax layer of a vinyl floor tile, the following procedure was carried out.

An aqueous wax, commercially available from Zep, was mixed with a small amount of fine graphite powder and applied to a vinyl floor tile with a substantially uniform thickness. The wax layer was dried, buffed with a cloth, and then allowed to dry overnight. After that, a second coat of the black-tinted wax was applied to the tile and was again dried, buffed, and allowed to dry overnight. A scrub test, as described above in Example 3 was then run on several of the dried, waxed tiles, using the following solvents, in neat form: n-butyl 3-hydroxybutyrate (NBHB), isopropyl 3-hydroxybutyrate (IPHB), acetone, propylene glycol butyl ether (PnB), propylene glycol propyl ether (PnP), d-limonene, dipropylene glycol methyl ether (DPM), dibasic ester (DBE), and ethylene glycol butyl ether (EB). The results are shown in FIG. 5.

Figure 5:
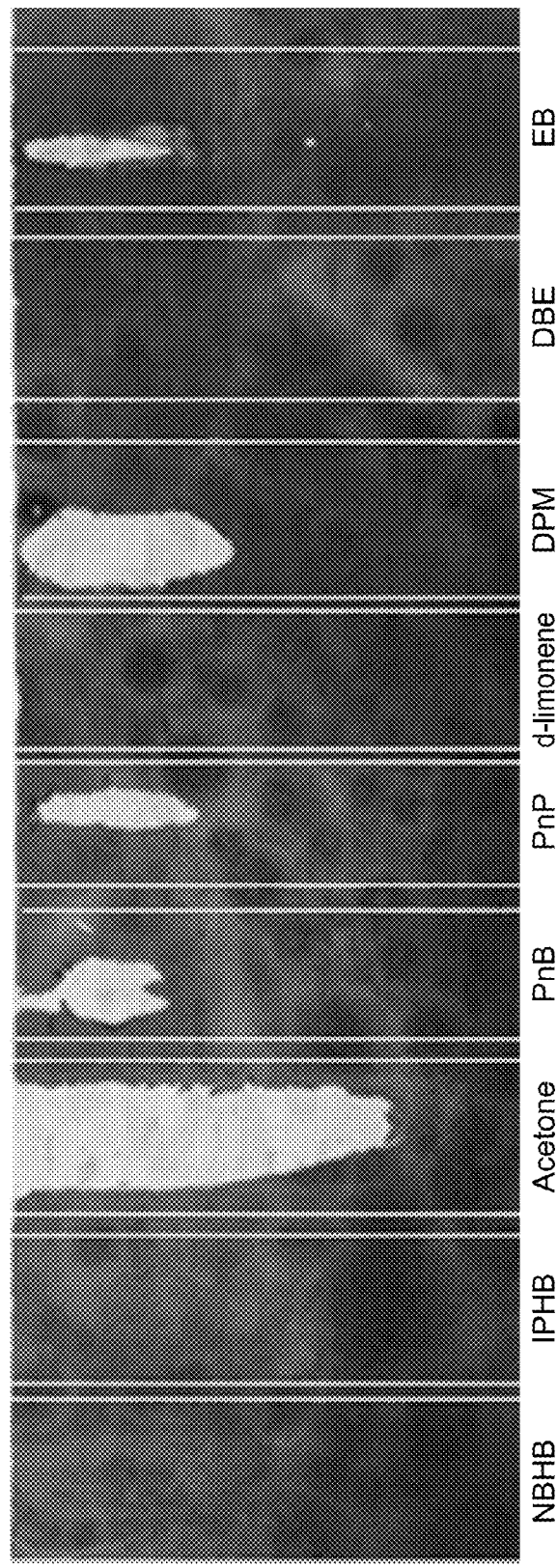
FIG. 5 depicts the results of a wax scrub test performed using several different solvents on a vinyl floor tile coated with black-tinted wax as described in Example 5 to demonstrate the interaction of each solvent with the wax coating.

As shown in FIG. 5, four of the solvents—n-butyl 3-hydroxybutyrate, isopropyl 3-hydroxybutyrate, d-limonene, and dibasic ester—did not remove the wax layer after 1000 strokes. The remaining solvents removed at least a portion of the wax layer, as indicated by the white streaks of underlying vinyl visible through the black-tinted wax. The number of strokes required to achieve the results shown in FIG. 5 for each of the solvents tested are summarized in Table 7, below.

TABLE 7

Number of Strokes for Several Solvents in Wax Test Shown in FIG. 5

| Solvent | # Strokes |
|---|---|
| NBHB | 1000 |
| IPHB | 1000 |
| Acetone | 50 |
| PnB | 500 |
| PnP | 500 |
| d-limonene | 1000 |
| DPM | 1000 |
| DBE | 1000 |
| EB | 900 |

The preferred forms of the invention described above are to be used as illustration only, and should not be used in a limiting sense to interpret the scope of the present invention. Obvious modifications to the exemplary one embodiment, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

We claim:

1. An aqueous cleaning composition comprising water and at least one organic solvent, wherein said organic solvent comprises an alkyl 3-hydroxybutyrate having an alkyl group selected from the group consisting of n-propyl, n-butyl, 2-butyl (sec-butyl), 2,2-dimethylethyl (tert-butyl), 3,3-dimethylpropyl (isopentyl), 1-pentyl (n-pentyl), 1-methylbutyl(2-pentyl), 2-methylbutyl, 2-ethylpropyl(3-pentyl), 1,1-dimethylpropyl, 1,2-dimethylpropyl, 2,2-dimethylpropyl (neopentyl), cyclopentyl, and combinations thereof, wherein said cleaning composition has a hydrophobic cleaning efficiency of at least 90 percent in less than 1,000 strokes, and further comprising at least one surfactant present in said composition in an amount in the range of from about 0.01 to about 15 weight percent, based on the total weight of said composition.

2. The cleaning composition of claim 1, wherein said alkyl group comprises 3 or 4 carbon atoms.

3. The cleaning composition of claim 1, wherein said organic solvent has a normal boiling point of at least 210° C.

4. The cleaning composition of claim 3, wherein said organic solvent has a vapor pressure not more than 0.09 torr measured at 20° C.

5. The cleaning composition of claim 1, wherein the total amount of components having a vapor pressure greater than 0.10 torr measured at 20° C. is not more than about 10 weight percent, based on the total weight of said composition.

6. The cleaning composition of claim 1, wherein said organic solvent has a flash point of at least 80° C. and an auto-ignition temperature at least 290° C.

7. The cleaning composition of claim 1, wherein said organic solvent has a corn oil-water coupling efficiency of at least 5 grams/gram.

8. The cleaning composition of claim 1, wherein said organic solvent has a density of not more than 0.985 g/mL measured at 20° C.

9. The cleaning composition of claim 1, wherein the solubility limit of said organic solvent in deionized water at 23° C. is in the range of from about 2 to about 20 weight percent and wherein the solubility limit of deionized water at 23° C. in said organic solvent is in the range of from about 6 to about 25 weight percent.

10. The cleaning composition of claim 1, wherein said organic solvent has a Hansen polar solubility parameter in the range of from about 2.50 to about 3.40 $(cal/cm^3)^{1/2}$.

11. The cleaning composition of claim 1, wherein said cleaning composition has a hydrophobic cleaning efficiency of at least 90 percent in less than 650 strokes.

12. The cleaning composition of claim 1, wherein said cleaning composition has a hydrophobic cleaning efficiency of at least 95 percent in less than 1000 strokes.

13. The cleaning composition of claim 1, wherein said cleaning composition has a hydrophilic cleaning efficiency of at least 90 percent in less than 300 strokes.

14. The cleaning composition of claim 1, wherein said cleaning composition has a pH in the range of from about 4 to about 8.

15. The cleaning composition of claim 1, wherein said organic solvent is present in said composition in an amount in the range of from about 0.1 to about 50 weight percent, wherein said water is present in said composition in an amount in the range of from about 30 to about 99.9 weight percent, based on the total weight of said composition.

16. The cleaning composition of claim 1, wherein the ratio, by weight, of said organic solvent to said water in said cleaning composition is in the range of from about 0.005:1 to about 0.50:1.

17. The cleaning composition of claim 1, wherein the total amount of components other than said organic solvent and said water in said cleaning composition is not more than about 15 weight percent, based on the total weight of said composition.

18. The cleaning composition of claim 1, wherein said surfactant has a hydrophilic-lipophilic balance (HLB) value in the range of from about 4 to about 16.

19. The cleaning composition of claim 18, wherein the ratio, by weight, of said organic solvent to said surfactant in said cleaning composition is in the range of from about 0.01:1 to about 50:1.

20. The cleaning composition of claim 18, wherein said organic solvent is present in said cleaning composition in an amount in the range of from about 0.1 to about 10 weight percent, wherein said water is present in said composition in an amount in the range of from about 75 to about 99.9 weight percent, based on the total weight of said composition.

21. The cleaning composition of claim 18, wherein the total amount of components other than said organic solvent, said water, and said surfactant present in said cleaning composition is not more than about 8 weight percent, based on the total weight of said composition.

22. The cleaning composition of claim 18, further comprising at least one additive selected from the group consisting of a cosolvents, complexing agents, dyes, fragrances, pH stabilizers, preservatives, defoaming agents, metal protectants, antioxidants, bactericides, fungicides, thickeners, fine or coarse grits, buffers, delaminates, whiteners, brighteners, solubilizers, builders, corrosion inhibitors, lotions, mineral oils, and enzymes.

23. The cleaning composition of claim 1, wherein said cleaning composition is in the form of a homogenous solution.

24. The cleaning composition of claim 1, wherein said cleaning composition is in the form of an emulsion or a micro-emulsion.

25. An aqueous cleaning composition comprising water and at least one ester-containing organic solvent, wherein said organic solvent comprises at least one alkyl ester having an alkyl group comprising at least 3 and not more than 5 carbon atoms, wherein said organic solvent has a vapor pressure of not more than 0.10 torr measured at 20° C. and a normal boiling point of at least 215° C., wherein said cleaning composition has a hydrophilic cleaning efficiency of at least 90 percent achieved in less than 500 strokes and a hydrophobic cleaning efficiency of at least 90 percent achieved in less than 1,000 strokes, and further comprising at least one surfactant present in said composition in an amount of at least 0.01 weight percent, based on the total weight of said composition.

26. The cleaning composition of claim 25, wherein said organic solvent comprises an alkyl hydroxybutyrate.

27. The cleaning composition of claim 26, wherein said alkyl hydroxybutyrate is an alkyl 3-hydroxybutyrate.

28. The cleaning composition of claim 25, wherein said organic solvent has a vapor pressure in the range of from about 0.060 to about 0.10 torr measured at 20° C.

29. The cleaning composition of claim 25, wherein said organic solvent has an auto-ignition temperature in the range of from about 290° C. and 345° C.

30. The cleaning composition of claim 25, wherein said organic solvent has a corn oil-water coupling efficiency in the range of from about 5 grams/gram to about 15 grams/gram.

31. The cleaning composition of claim 25, wherein said organic solvent has a density in the range of from about 0.955 to about 0.985 g/mL measured at 20° C.

32. The cleaning composition of claim 25, wherein the solubility limit of said organic solvent in deionized water at 23° C. is in the range of from about 2 to about 20 weight percent and wherein the solubility limit of deionized water at 23° C. in said organic solvent is in the range of from about 6 to about 25 weight percent.

33. The cleaning composition of claim 25, wherein said organic solvent has a Hansen polar solubility parameter in the range of from about 2.50 to about 3.40 $(cal/cm^3)^{1/2}$.

34. The cleaning composition of claim 25, wherein said cleaning composition has a hydrophobic cleaning efficiency of at least 90 percent in less than 650 strokes.

35. The cleaning composition of claim 25, wherein said cleaning composition has a hydrophilic cleaning efficiency of at least 90 percent in less than 125 strokes.

36. The cleaning composition of claim 25, wherein said organic solvent is present in said composition in an amount in the range of from about 0.1 to about 50 weight percent, wherein said water is present in said composition in an amount in the range of from about 30 to about 99.9 weight percent, based on the total weight of said composition, wherein the ratio, by weight, of said organic solvent to said water in said cleaning composition is in the range of from about 0.005:1 to about 0.50:1, and wherein the total amount of components other than said organic solvent and said water in said cleaning composition is not more than about 15 weight percent, based on the total weight of said composition.

37. The cleaning composition of claim 25, wherein the ratio, by weight, of said organic solvent to said surfactant in said cleaning composition is in the range of from about 0.01:1 to about 50:1, wherein the total amount of components other than said organic solvent, said water, and said surfactant present in said cleaning composition is not more than about 8 weight percent, based on the total weight of said composition.

38. The cleaning composition of claim 25, wherein said cleaning composition is in the form of an emulsion or a micro-emulsion.

39. An aqueous cleaning composition comprising:
(a) at least 90 weight percent water;
(b) at least one ester-containing organic solvent, wherein said organic solvent comprises an alkyl ester having an alkyl group comprising at least 3 and not more than 5 carbon atoms;
(c) at least one surfactant; and
(d) at least 0.10 weight percent of at least one additive, wherein each of the percentages is based on the total weight of said composition, wherein said cleaning composition has a hydrophobic cleaning efficiency of at least 90 percent in less than 650 strokes and/or wherein said cleaning composition has a hydrophilic cleaning efficiency of at least 90 percent in less than 300 strokes.

40. The cleaning composition of claim 39, wherein said organic solvent has a corn oil-water coupling efficiency in the range of from about 5 grams/gram to about 15 grams/gram.

41. The cleaning composition of claim 39, wherein said organic solvent has a normal boiling point of at least 210° C. and an auto-ignition temperature of not more than about 345° C.

42. The cleaning composition of claim 39, wherein said cleaning composition has a hydrophobic cleaning efficiency of at least 90 percent in less than 650 strokes and wherein said cleaning composition has a hydrophilic cleaning efficiency of at least 90 percent in less than 300 strokes.

43. The cleaning composition of claim 39, wherein the pH of said cleaning composition is in the range of from about 5 to about 7.

44. The cleaning composition of claim 39, wherein said additive is selected from the group consisting of cosolvents, complexing agents, dyes, fragrances, pH stabilizers, preservatives, defoaming agents, metal protectants, antioxidants, bactericides, fungicides, thickeners, fine or coarse grits, buffers, delaminates, whiteners, brighteners, solubilizers, builders, corrosion inhibitors, lotions, mineral oils, enzymes, and combinations thereof.

45. The cleaning composition of claim 44, wherein the ratio, by weight, of said organic solvent to the total amount of said water in said cleaning composition is at least 0.01:1.

46. The cleaning composition of claim 44, wherein the total amount of said surfactant and said additive in said cleaning composition is not more than 10 weight percent, based on the total weight of said composition, and wherein the ratio, by weight, of said organic solvent to the total amount of said water in said cleaning composition is in the range of from about 0.005:1 to 0.035:1.

47. The cleaning composition of claim 39, wherein said organic solvent comprises an alkyl 3-hydroxybutyrate.

48. The cleaning composition of claim 39, wherein said organic solvent comprises a butyl 3-hydroxybutyrate.

49. The cleaning composition of claim 25, wherein said organic solvent comprises an alkyl hydroxybutyrate and wherein the solubility limit of said organic solvent in deionized water at 23° C. is in the range of from about 2 to about 15 weight percent.

50. The cleaning composition of claim 49, wherein said alkyl hydroxybutyrate is an alkyl 3-hydroxybutyrate.

51. The cleaning composition of claim 39, wherein said surfactant is present in said composition in an amount of not more than 8 weight percent.

* * * * *